（12) United States Patent
Haseba et al.

(10) Patent No.: US 8,349,209 B2
(45) Date of Patent: *Jan. 8, 2013

(54) LIQUID CRYSTAL COMPOSITION AND LIQUID CRYSTAL ELEMENT

(75) Inventors: Yasuhiro Haseba, Ichihara (JP);
Hirotsugu Kikuchi, Fukuoka (JP)

(73) Assignees: JNC Corporation, Tokyo (JP); JNC Petrochemical Corporation, Tokyo (JP)

( * ) Notice: Subject to any disclaimer, the term of this patent is extended or adjusted under 35 U.S.C. 154(b) by 151 days.

This patent is subject to a terminal disclaimer.

(21) Appl. No.: 12/282,872

(22) PCT Filed: Mar. 9, 2007

(86) PCT No.: PCT/JP2007/055300
§ 371 (c)(1),
(2), (4) Date: Feb. 4, 2009

(87) PCT Pub. No.: WO2007/105803
PCT Pub. Date: Sep. 20, 2007

(65) Prior Publication Data
US 2009/0323010 A1  Dec. 31, 2009

(30) Foreign Application Priority Data
Mar. 13, 2006   (JP) .................................. 2006-67521

(51) Int. Cl.
*C09K 19/00* (2006.01)
*C09K 19/06* (2006.01)
*C09K 19/32* (2006.01)
*C09K 19/52* (2006.01)
*C09K 19/02* (2006.01)

(52) U.S. Cl. ........... 252/299.01; 252/299.6; 252/299.61; 252/299.62; 252/299.63; 252/299.64; 252/299.65; 252/299.66; 428/1.1; 428/1.3; 349/167; 349/182

(58) Field of Classification Search ............. 252/299.01, 252/299.6, 299.61–299.66; 430/20; 349/182, 349/167; 428/1.1, 1.3
See application file for complete search history.

(56) References Cited

U.S. PATENT DOCUMENTS
7,648,647 B2 * 1/2010 Kikuchi et al. .......... 252/299.01

FOREIGN PATENT DOCUMENTS
| JP | 06-316541 A1 | 11/1994 |
| JP | 2000-515496 A1 | 11/2000 |
| JP | 2002-155281 A1 | 5/2002 |
| JP | 2003-327966 | 11/2003 |
| JP | 2004-182881 A1 | 7/2004 |
| JP | 2005-336477 A | 12/2005 |
| WO | 98/00428 A1 | 1/1998 |

OTHER PUBLICATIONS

Nature Materials, Polymer-Stablilized Liquid Crystal Blue Phases, 1, 64-68 (2002).
Advanced Materials, Large Electro-Optic Kerr Effect in Polymer-Stablized Liquid-Crystalline Blue Phases, 17, 96-98 (2005).
Advanced Materials, Large Electro-Optic Kerr Effect in Nanostructured Chiral Liquid-Crystal Composites Over a Wide Temperature Range, 17, 2311-2315 (2005).
Handbook of Liquid Crystal, p. 196 (Published in 2000, Maruzen0.
2002 Nen Japanese Liquid Crystal Society Toronkai Koen Yokoshu, 2002 Nen, Extension of Blue Phase Temperature Range by Polymer Network, pp. 165-166 (International Search Reportg.
Edited by the Chemical Society of Japan, Ekisho No Kagaku, Japan Scientific Societies Press, 1994 Nen, p. 47 (International Search Report).
Office Action, Japan Patent Office, Sep. 24, 2012, corresponding application in Japan [in Japanese with English translation].
European Examination Search Report, EP07738747 (corresponding application to U.S. Appl. No. 12/282,872), mailed Oct. 26, 2012.

* cited by examiner

*Primary Examiner* — Geraldina Visconti
(74) *Attorney, Agent, or Firm* — Hogan Lovells US LLP

(57) ABSTRACT

The invention provides a liquid crystal composition having an optically isotropic liquid crystal phase used in an element driven in a state of an optically isotropic liquid crystal phase, which comprises a compound 1 having the clearing point $T_1$ and a compound 2 having the clearing point $T_2$, and which has the clearing point Tx, wherein the liquid crystal composition comprises 10 to 80 wt % of compound 1 and 20 to 90 wt % of compound 2, and wherein the clearing point $T_1$, the clearing point $T_2$ and the clearing point Tx of the liquid crystal composition satisfy the following conditions:

$T_1 > T_2$ $T_1 - Tx \geq 100°\ C.$

28 Claims, 3 Drawing Sheets

LIQUID CRYSTAL COMPOSITION AND LIQUID CRYSTAL ELEMENT

CROSS REFERENCE TO RELATED APPLICATIONS

This application claims priority under 35 U.S.C. §371 to International Application No. PCT/JP2007/055300 (filed Mar. 9, 2007) which claims priority to Japanese Patent Application JP2006-67521 (filed Mar. 13, 2006), each of which application are expressly incorporated herein by reference in their entirety.

TECHNICAL FIELD

The invention relates to an optically isotropic liquid crystal composition used in an element driven in a state of an optically isotropic liquid crystal phase and a liquid crystal element comprising the composition.

BACKGROUND ART

When a nematic liquid crystal material is heated in a state where a nematic phase is exhibited, an isotropic phase is gradually appeared. In such an isotropic phase in a nematic liquid crystal material (hereinafter sometimes referred to as "non-liquid crystalline isotropic phase"), the Kerr effect, which is a phenomenon in which a value of electric birefringence $\Delta n_E$ (a value of birefringence induced when electric field is applied on an isotropic medium) is proportional to the square of electric field E [$\Delta n_E = K\lambda E^2$ (K: Kerr constant (Kerr coefficient), λ: wavelength)], is observed. Specifically, a high Kerr constant is observed at a temperature just above the nematic phase-isotropic phase transition temperature. It is thought that the Kerr effect is attributed to the presence of short range order of nematic molecular alignment generated by heat fluctuation in a non-liquid crystalline isotropic phase.

In the case of a liquid crystal material, the Kerr effect is observed not only in a non-liquid crystalline isotropic phase but also in a blue phase. A blue phase is generally exhibited between a chiral nematic phase and a non-liquid crystalline isotropic phase, and in general, the temperature range thereof is very narrow (about 1 to 2° C.).

On the other hand, in a composite material of a polymer and a chiral liquid crystal, an "optically isotropic liquid crystal phase (a phase in which liquid crystal molecular alignment is macroscopically isotropic, and liquid crystalline order is microscopically present)" is exhibited in a relatively wide temperature range, and in such a phase, the Kerr effect with a high Kerr constant has been observed (for example, see Japanese Laid-Open Patent Publication No. 2003-327966; Nature Materials, 1, 64-68 (2002); Advanced Materials, 17, 96-98 (2005); and Advanced Materials, 17, 2311-2315 (2005)).

However, since such a composite material comprises a polymer, there is a problem that birefringence may remain even if returning to a liquid crystalline state, in which electric field is not applied, after application of high electric field. Moreover, there is a possibility that problems regarding increase in drive voltage and long-term reliability may occur when using a composite material comprising a polymer for a liquid crystal element. Therefore, in the case of liquid crystal elements such as display element, use of a composite material with a polymer is limited.

DISCLOSURE OF THE INVENTION

Under the above-described circumstances, a liquid crystal material in which large electric birefringence (including the Kerr effect with a high Kerr constant) is observed is desired. Moreover, a liquid crystal material, in which birefringence does not remain even if returning to a liquid crystalline state, in which electric field is not applied, after application of high electric field, is desired. A liquid crystal material with excellent long-term reliability is desired. Furthermore, a liquid crystal material which does not include a polymer is desired.

The inventors found a novel liquid crystal composition and completed the invention based on this finding. The invention provides the following liquid crystal compositions, liquid crystal elements, etc. Note that the term "nematic phase" as used herein means a narrowly-defined nematic phase in which no chiral nematic phase is included, unless otherwise specified.

[1] An optically isotropic liquid crystal composition, which is used in an element driven in a state of an optically isotropic liquid crystal phase, and which does not exhibit a nematic phase.

[2] The liquid crystal composition according to item [1], wherein the optically isotropic liquid crystal phase does not show diffracted light with two or more colors.

[3] The liquid crystal composition according to item [1], wherein the optically isotropic liquid crystal phase shows diffracted light with two or more colors.

[4] The liquid crystal composition according to item [2] or [3], which comprises a compound I having the clearing point $T_1$ and a compound 2 having the clearing point $T_2$, and which has the clearing point Tx, wherein the liquid crystal composition comprises 10 to 80 wt % of compound 1 and 20 to 90 wt % of compound 2, and wherein the clearing point $T_1$, the clearing point $T_2$ and the clearing point Tx of the liquid crystal composition satisfy the following conditions:

$T_1 > T_2$ $T_1 - T_x \geq 100°$ C.

[5] The liquid crystal composition according to item [2] or [3], which comprises a compound 1 having the clearing point $T_1$ and a compound 2 having the clearing point $T_2$, and which has the clearing point Tx, wherein the liquid crystal composition comprises 5 to 70 wt % of compound 1 and 30 to 95 wt % of compound 2, and wherein the clearing point $T_1$, the clearing point $T_2$ and the clearing point Tx of the liquid crystal composition satisfy the following conditions:

$T_1 > T_2$ $T_1 - Tx \geq 150°$ C.

[6] The liquid crystal composition according to item [2] or [3], which comprises a compound 1 having the clearing point $T_1$ and a compound 2 having the clearing point $T_2$, and which has the clearing point Tx, wherein the liquid crystal composition comprises 5 to 70 wt % of compound 1 and 30 to 95 wt % of compound 2, and wherein the clearing point $T_1$, the clearing point $T_2$ and the clearing point Tx of the liquid crystal composition satisfy the following conditions:

$T_1 > T_2$ $T_1 - Tx \geq 200°$ C.

[7] The liquid crystal composition according to item [2] or [3], which comprises a compound 1 having the clearing point $T_1$ and a compound 2 having the clearing point $T_2$, and which has the clearing point Tx, wherein the liquid crystal composition comprises 10 to 80 wt % of compound 1 and 20 to 90 wt % of compound 2, and wherein the clearing point $T_1$, the clearing point $T_2$ and the clearing point Tx of the liquid crystal composition satisfy the following conditions:

$T_1 > T_2$ $T_1 - Tx \geq 100°$ C., and wherein the liquid crystal composition is obtained by further adding chiral dopants to a composition in which the difference between the upper limit and the lower limit of a temperature allowing coexistence of a chiral nematic phase and a non-liquid crystalline isotropic phase is 3° C. to 150° C.

[8] The liquid crystal composition according to item [2] or [3], which comprises a compound 1 having the clearing point $T_1$ and a compound 2 having the clearing point $T_2$, and which has the clearing point Tx, wherein the liquid crystal composition comprises 5 to 70 wt % of compound 1 and 30 to 95 wt % of compound 2, and wherein the clearing point $T_1$, the clearing point $T_2$ and the clearing point Tx of the liquid crystal composition satisfy the following conditions:

$T_1 > T_2$ $T_1 - Tx \geq 150°$ C., and wherein the liquid crystal composition is obtained by further adding chiral dopants to a composition in which the difference between the upper limit and the lower limit of a temperature allowing coexistence of a chiral nematic phase and a non-liquid crystalline isotropic phase is 3° C. to 150° C.

[9] The liquid crystal composition according to [7], wherein the liquid crystal composition comprises 30 to 60 wt % of compound 1 and 30 to 70 wt % of compound 2.

[10] The liquid crystal composition according to any one of items [4] to [9], wherein the compound 1 is represented by the following general formula (1):

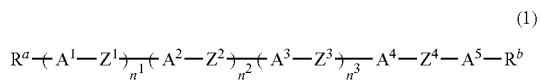

(1)

wherein:

$R^a$ is hydrogen or alkyl having 1 to 20 carbon atoms, wherein any —$CH_2$— in the alkyl can be replaced by —O—, —S—, —COO—, —OCO—, —CH=CH—, —CF=CF— or —C≡C—, and any hydrogen in the alkyl group can be replaced by halogen;

$R^b$ is hydrogen, halogen, —CN, —N=C=O, —N=C=S, —$CF_3$, —$OCF_3$ or alkyl having 1 to 20 carbon atoms, wherein any —$CH_2$— in the alkyl can be replaced by —O—, —S—, —COO—, —OCO—, —CH=CH—, —CF=CF— or —C≡C—, and any hydrogen in the alkyl can be replaced by halogen, and —$CH_3$ in the alkyl can be replaced by —CN;

$A^1$ to $A^5$ are each independently an aromatic or nonaromatic 3- to 8-membered ring or a condensed ring having 9 or more carbon atoms, wherein: any hydrogen in these rings can be replaced by halogen, alkyl having 1 to 3 carbon atoms or alkyl halide having 1 to 3 carbon atoms; any —$CH_2$— in the rings can be replaced by —O—, —S—, or —NH—; any —CH= in the rings can be replaced by —N=; and $A^1$ to $A^5$ are not tetrahydropyran rings;

$Z^1$ to $Z^4$ are each independently a single bond or alkylene having 1 to 8 carbon atoms, wherein any —$CH_2$— in the alkylene can be replaced by —O—, —S—, —COO—, —OCO—, —CSO—, —OCS—, —N=N—, —CH=N—, —N=CH—, —N(O)=N—, —N=N(O)—, —CH=CH—, —CF=CF— or —C≡C—, and any hydrogen can be replaced by halogen; and $n^1$ to $n^3$ are each independently 0 or 1; when $R^b$ is hydrogen or fluorine, $n^2$ and $n^3$ are 1; when $Z^4$ is —COO—, $n^2$ and $n^3$ are 1; and only when at least one of $A^4$ and $A^5$ is a condensed ring having 9 or more carbon atoms, all of $n^1$ to $n^3$ can be 0, and wherein the clearing point of the compound is 150° C. to 400° C.

[11] The liquid crystal composition according to item [10], wherein:

$R^a$ is alkyl having 1 to 10 carbon atoms, wherein any —$CH_2$— in the alkyl can be replaced by —O—, —S—, —COO—, —OCO—, —CH=CH— or —C≡C—;

$R^b$ is halogen, —CN, 13 N=C=O, —N=C=S, —$CF_3$, —$OCF_3$ or alkyl having 1 to 20 carbon atoms, wherein any —$CH_2$— in the alkyl can be replaced by —O—, —CH=CH— or —C≡C—, and any hydrogen in the alkyl can be replaced by halogen, and —$CH_3$ in the alkyl can be replaced by —CN;

$A^1$ to $A^5$ are each independently a benzene ring, a naphthalene ring or a cyclohexane ring, wherein any hydrogen in these rings can be replaced by halogen, alkyl having 1 to 3 carbon atoms or alkyl halide having 1 to 3 carbon atoms, and any —$CH_2$— in the rings can be replaced by —O— or —S—, and any —CH= in the rings can be replaced by —N=;

$Z^1$ to $Z^4$ are each independently a single bond or alkylene having 1 to 4 carbon atoms, wherein any —$CH_2$— in the alkylene can be replaced by —O—, —S—, —COO—, —OCO—, —CSO—, —OCS—, —CH=CH—, —CF=CF— or —C≡C—, and any hydrogen can be replaced by halogen; and $n^1$ to $n^3$ are each independently 0 or 1; when $R^b$ is hydrogen or fluorine, $n^2$ and $n^3$ are 1; and only when at least one of $A^4$ and $A^5$ is a condensed ring having 9 or more carbon atoms, all of $n^1$ to $n^3$ can be 0.

[12] The liquid crystal composition according to item [10], wherein:

$R^a$ is alkyl having 1 to 10 carbon atoms, wherein any —$CH_2$— in the alkyl can be replaced by —CH=CH— or —C≡C—;

$R^b$ is fluorine, chlorine, —CN, —N=C=S or alkyl having 1 to 20 carbon atoms, wherein any —$CH_2$— in the alkyl can be replaced by —O—, —CH=CH— or —C≡C—;

$A^1$ to $A^5$ are each independently a benzene ring, a naphthalene ring or a cyclohexane ring, wherein any hydrogen in the rings can be replaced by fluorine, chlorine, methyl, or methyl halide, and any —$CH_2$— in the rings can be replaced by —O— or —S—, and any —CH= in the rings can be replaced by —N=;

$Z^1$ to $Z^4$ are each independently a single bond or —C≡C—; and $n^1$ to $n^3$ are each independently 0 or 1; when $R^b$ is hydrogen or fluorine, $n^2$ and $n^3$ are 1; and only when at least one of $A^4$ and $A^5$ is a condensed ring having 9 or more carbon atoms, all of $n^1$ to $n^3$ can be 0.

[13] The liquid crystal composition according to item [10], wherein:

$R^a$ is alkyl having 1 to 10 carbon atoms, wherein any —$CH_2$— in the alkyl can be replaced by —O— or —CH=CH—;

$R^b$ is fluorine, chlorine, —CN or alkyl having 1 to 10 carbon atoms, wherein any —$CH_2$— in the alkyl can be replaced by —O—;

$A^1$ to $A^5$ are each independently a benzene ring, a dioxane ring or a cyclohexane ring, wherein any hydrogen in the benzene ring can be replaced by fluorine;

$Z^1$ to $Z^4$ are each independently a single bond or —C≡C—; and $n^1$ is 1, and $n^2$ and $n^3$ are 0.

[14] The liquid crystal composition according to any one of items [10] to [13], wherein the compound 2 is represented by the following general formula (2):

wherein:

$R^c$ is hydrogen or alkyl having 1 to 20 carbon atoms, wherein any —CH$_2$— in the alkyl can be replaced by —O—, —S—, —COO—, —OCO—, —CH=CH—, —CF=CF— or —C≡C—, and any hydrogen in the alkyl can be replaced by halogen;

$R^d$ is halogen, —CN, —N=C=O, —N=C=S, —CF$_3$, —OCF$_3$, —C≡C—CN, or —C≡C—CF$_3$;

$A^6$ and $A^7$ are each independently an aromatic or nonaromatic 3- to 8-membered ring or a condensed ring having 9 or more carbon atoms, wherein any hydrogen in the rings can be replaced by halogen, alkyl having 1 to 3 carbon atoms or alkyl halide having 1 to 3 carbon atoms; any —CH$_2$— in the rings can be replaced by —O—, —S—, or —NH—; and any —CH= in the rings can be replaced by —N=;

$Z^6$ is a single bond or alkylene having 1 to 8 carbon atoms, wherein any —CH$_2$— in the alkylene can be replaced by —O—, —S—, —COO—, —OCO—, —CSO—, —OCS—, —N=N—, —CH=N—, —N=CH—, —N(O)=N—, —N=N(O)—, —CH=CH—, —CF=CF— or —C≡C—, and any hydrogen in the alkylene can be replaced by halogen; and $n^6$ is 0 or 1; and when $A^7$ is a condensed ring having 9 or more carbon atoms, $n^6$ is 0.

[15] The liquid crystal composition according to any one of items [10] to [13], wherein:

$R^c$ is alkyl having 1 to 10 carbon atoms, wherein any —CH$_2$— in the alkyl can be replaced by —O—, —S—, —COO—, —OCO—, —CH=CH— or —C≡C—;

$R^d$ is halogen, —CN, —N=C=S, —CF$_3$, —C≡C—CN or —C≡C—CF$_3$;

$A^6$ and $A^7$ are each independently a benzene ring, a naphthalene ring or a cyclohexane ring, wherein any hydrogen in these rings can be replaced by halogen, alkyl having 1 to 3 carbon atoms, or alkyl halide having 1 to 3 carbon atoms; any —CH$_2$— in the rings can be replaced by —O— or —S—; and any —CH= in the rings can be replaced by —N=;

$Z^6$ is a single bond or alkylene having 1 to 4 carbon atoms, wherein any —CH$_2$— in the alkylene can be replaced by —O—, —S—, —COO—, —OCO—, —CSO—, —OCS—, —CH=CH—, —CF=CF— or —C≡C—; and any hydrogen in the alkylene can be replaced by halogen; and n is 0 or 1; and when $A^7$ is a naphthalene ring, $n^6$ is 0.

[16] The liquid crystal composition according to any one of items [10] to [13], wherein:

$R^c$ is alkyl having 1 to 10 carbon atoms, wherein any —CH$_2$— in the alkyl can be replaced by —CH=CH— or —C≡C—;

$R^d$ is halogen, —CN, —N=C=S, —CF$_3$, —C≡C—CN or —C≡C—CF$_3$.

$A^6$ and $A^7$ are each independently a benzene ring, a naphthalene ring or a cyclohexane ring, wherein any hydrogen in these rings can be replaced by fluorine, chlorine, methyl or methyl halide; any —CH$_2$— in these rings can be replaced by —O— or —S—; and any —CH= in the rings can be replaced by —N—;

$Z^6$ is a single bond, —COO—, —CF$_2$O— or —C≡C—; and $n^6$ is 0 or 1; and when $A^7$ is a naphthalene ring, $n^6$ is 0.

[17] The liquid crystal composition according to any one of items [10] to [13], wherein:

$R^c$ is alkyl having 1 to 10 carbon atoms, wherein any —CH$_2$— in the alkyl can be replaced by —O—;

$R^d$ is halogen or —CN;

$A^6$ and $A^7$ are each independently a benzene ring, a dioxane ring or a cyclohexane ring, wherein any hydrogen in the benzene ring can be replaced by fluorine;

$Z^6$ is a single bond or —COO—; and $n^6$ is 0 or 1.

[18] The liquid crystal composition according to any one of items [10] to [13], wherein the compound 2 is represented by the following general formula (3):

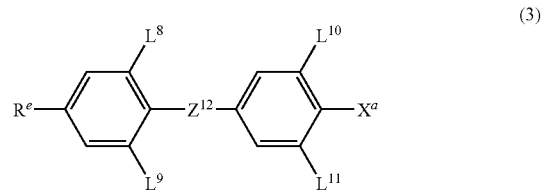

wherein:

$R^e$ is alkyl having 1 to 10 carbon atoms, wherein any —CH$_2$— in the alkyl can be replaced by —O—, —S—, —COO—, —OCO—, —CH=CH—, —CF=CF— or —C≡C—; and any hydrogen in the alkyl can be replaced by halogen;

$X^a$ is fluorine, chlorine, —CN, —N=C=S, —CF$_3$, —C≡C—CN or —C≡C—CF$_3$;

$Z^{12}$ is a single bond, —COO— or —C≡C—; and $L^8$ to $L^{11}$ are each independently hydrogen or fluorine.

[19] The liquid crystal composition according to any one of items [10] to [13], wherein:

$R^e$ is alkyl having 1 to 10 carbon atoms, wherein any —CH$_2$— in the alkyl can be replaced by —O—, —CH=CH— or —C≡C—;

$X^a$ is fluorine or —CN;

$Z^{12}$ is —COO—; and $L^8$ to $L^{11}$ are each independently hydrogen or fluorine, wherein at least two of them are fluorine.

[20] The liquid crystal composition according to item [2] or [3], which is obtained by further adding chiral dopants to a composition in which the difference between the upper limit and the lower limit of a temperature allowing coexistence of a chiral nematic phase and a non-liquid crystalline isotropic phase is 3° C. to 150° C.

[21] The liquid crystal composition according to item [2] or [3], which is obtained by further adding chiral dopants to a composition in which the difference between the upper limit and the lower limit of a temperature allowing coexistence of a chiral nematic phase and a non-liquid crystalline isotropic phase is 5° C. to 150° C.

[22] The liquid crystal composition according to item [2] or [3], which is obtained by further adding chiral dopants to a composition in which the difference between the upper limit and the lower limit of a temperature allowing coexistence of a nematic phase and a non-liquid crystalline isotropic phase is 3° C. to 150° C.

[23] The liquid crystal composition according to any one of items [1] to [22], wherein the chiral dopants are included in an amount of 1 to 40 wt % per the total weight of the liquid crystal composition.
[24] The liquid crystal composition according to any one of items [1] to [22], wherein the chiral dopants are included in an amount of 5 to 15 wt % per the total weight of the liquid crystal composition.
[25] The liquid crystal composition according to item [23] or [24], wherein the pitch is 700 nm or lower.
[26] The liquid crystal composition according to any one of items [23] to [25], wherein the chiral dopants comprise one or more compounds represented by any one of the following formulae (K1) to (K5):

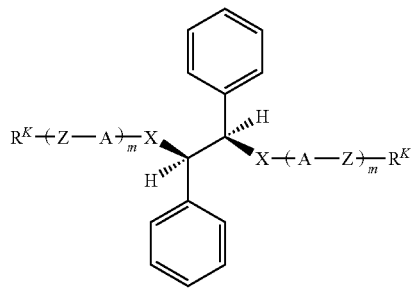
(K1)

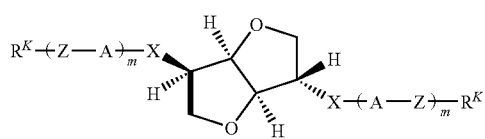
(K2)

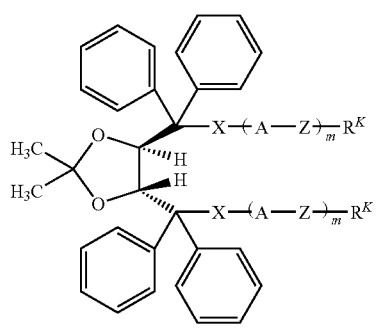
(K3)

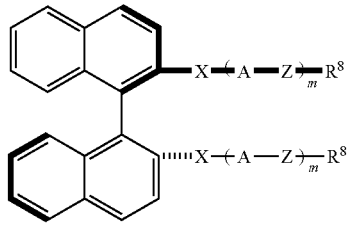
(K4)

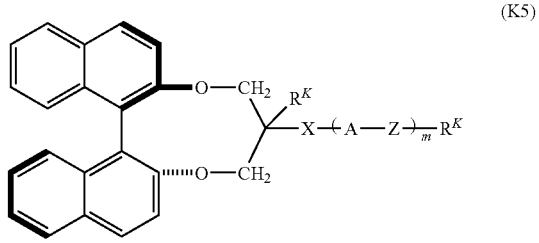
(K5)

wherein:

each $R^K$ is independently hydrogen, halogen, —CN, —N=C=O, —N=C=S or alkyl having 1 to 20 carbon atoms, wherein any —CH$_2$— in the alkyl can be replaced by —O—, —S—, —COO—, —OCO—, —CH=CH—, —CF=CF— or —C≡C—; and any hydrogen in the alkyl can be replaced by halogen;

each A is independently an aromatic or nonaromatic 3- to 8-membered ring or a condensed ring having 9 or more carbon atoms, wherein any hydrogen in these rings can be replaced by halogen, alkyl having 1 to 3 carbon atoms or haloalkyl having 1 to 3 carbon atoms; any —CH$_2$— in the rings can be replaced by —O—, —S— or —NH—; and any —CH= in the rings can be replaced by —N=;

each Z is independently a single bond or alkylene having 1 to 8 carbon atoms, wherein any —CH$_2$— can be replaced by —O—, —S—, —COO—, —OCO—, —CSO—, —OCS—, —N=N—, —CH=N—, —N=CH—, —N(O)=N—, —N=N(O)—, —CH=CH—, —CF=CF— or —C≡C—; and any hydrogen can be replaced by halogen;

X is a single bond, —COO—, —CH$_2$O—, —CF$_2$O— or —CH$_2$CH$_2$—; and m is 1 to 4.

[27] The liquid crystal composition according to any one of items [23] to [25], wherein the chiral dopants comprise one or more compounds represented by any one of the following formulae (K2-1) to (K2-8) and (K5-1) to (K5-3):

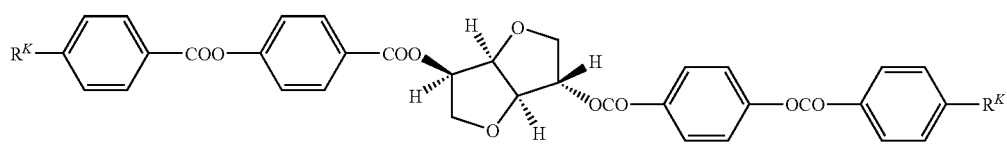
(K2-1)

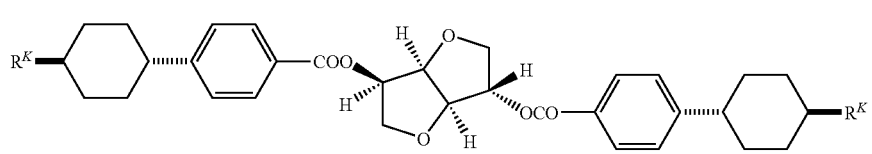
(K2-2)

-continued

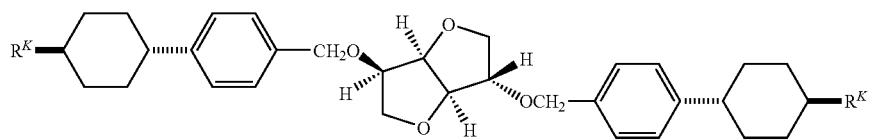
(K2-3)

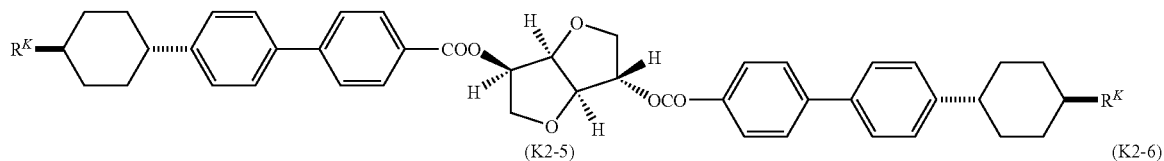
(K2-4)

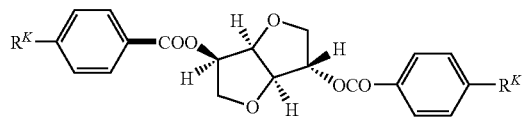
(K2-5)

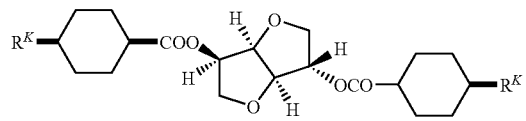
(K2-6)

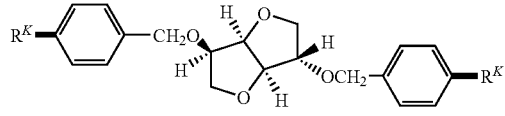
(K2-7)

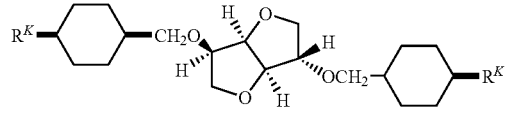
(K2-8)

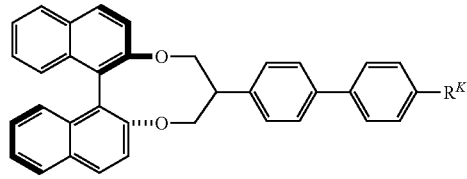
(K5-1)

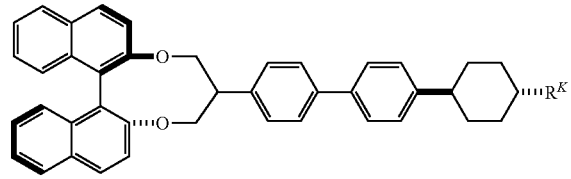
(K5-2)

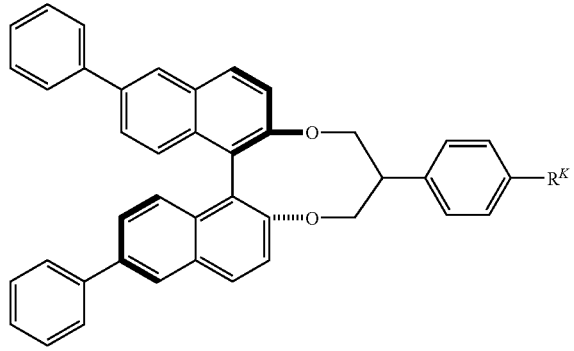
(K5-3)

wherein:

each $R^K$ is independently alkyl having 3 to 10 carbon atoms, wherein —CH$_2$— adjacent to the ring in the alkyl can be replaced by —O—; and any —CH$_2$— in the alkyl can be replaced by —CH=CH—.

[28] A liquid crystal composition, which comprises a compound 1 having the clearing point $T_1$, a compound 2 having the clearing point $T_2$ and chiral dopants, and whose clearing point is Tx, wherein:

the liquid crystal composition comprises 20 to 40 wt % of compound 1, 20 to 60 wt % of compound 2, and 5 to 20 wt % of chiral dopants;

the compound 1 is represented by the following general formula (1):

(1)

wherein:

$R^a$ and $R^b$ are each independently alkyl having 1 to 10 carbon atoms, wherein any —CH$_2$— in the alkyl can be replaced by —O—;

$A^1$ to $A^4$ are each independently a benzene ring, a dioxane ring or a cyclohexane ring, wherein any hydrogen in these rings can be replaced by fluorine, and $A^5$ is a benzene ring;

$Z^1$ to $Z^4$ are each independently a single bond or —C≡C—; and $n^1$ is 1, and $n^2$ and $n^3$ are 0;

the compound 2 consists of a compound represented by the following general formula (2) and a compound represented by the following general formula (3),

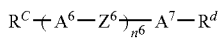
(2)

wherein in the formula (2):
$R^c$ is alkyl having 1 to 10 carbon atoms, wherein any —$CH_2$— in the alkyl can be replaced by —O—;
$R^d$ is halogen or —CN;
$A^6$ is a benzene ring or a cyclohexane ring, wherein any hydrogen in these rings can be replaced by fluorine, and $A^7$ is independently a benzene ring;
$Z^6$ is a single bond or —COO—; and
$n^6$ is 1,

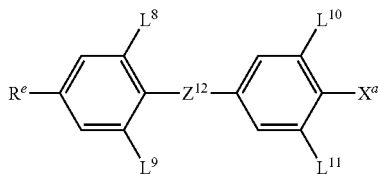
(3)

and wherein in the formula (3):
$R^e$ is alkyl having 1 to 10 carbon atoms, wherein any —$CH_2$— in the alkyl can be replaced by —O—, —CH=CH— or —C≡C—;
$X^a$ is fluorine or —CN;
$Z^{12}$ is —COO—; and
$L^8$ to $L^{11}$ are each independently hydrogen or fluorine, wherein at least two of them are fluorine, and at least one of $L^{10}$ and $L^{11}$ is fluorine, and wherein the chiral dopants comprise one or more compounds represented by the following formulae (K2-5) to (K2-8):

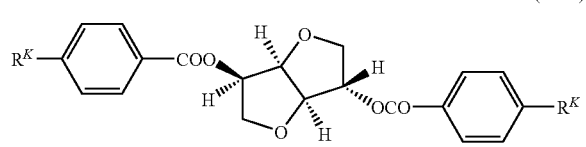
(K2-5)

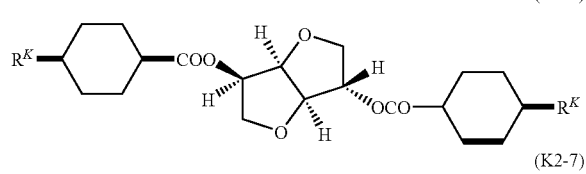
(K2-6)

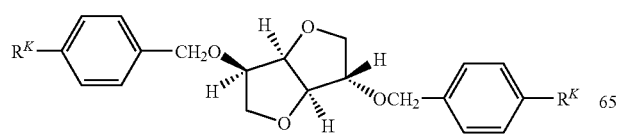
(K2-7)

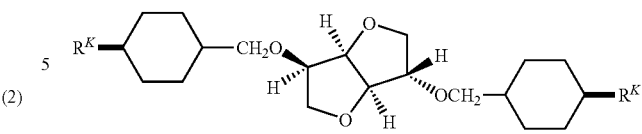
(K2-8)

wherein each $R^K$ is independently alkyl having 3 to 10 carbon atoms, wherein —$CH_2$— adjacent to the ring in the alkyl can be replaced by —O—, and any —$CH_2$— in the alkyl can be replaced by —CH=CH—;

the clearing point $T_1$, the clearing point $T_2$ and the clearing point Tx of the liquid crystal composition satisfy the following conditions:

$T_1 > T_2$ $T_1 - Tx \geq 100°$ C.; and an optically isotropic liquid crystal phase has an optically isotropic phase which does not show diffracted light with two or more colors.

[29] A liquid crystal composition, which comprises a compound 1 having the clearing point $T_1$, a compound 2 having the clearing point $T_2$ and chiral dopants, and whose clearing point is Tx,
wherein:
the liquid crystal composition comprises 8 to 30 wt % of compound 1, 40 to 60 wt % of compound 2, and 5 to 20 wt % of chiral dopants;
the compound 1 is represented by the following general formula (1):

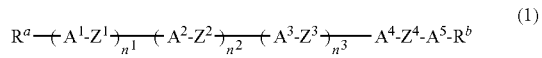
(1)

wherein:
$R^a$ is alkyl having 1 to 10 carbon atoms, wherein any —$CH_2$— in the alkyl can be replaced by —O—;
$A^1$ to $A^4$ are each independently a benzene ring, a dioxane ring or a cyclohexane ring, wherein any hydrogen in the benzene ring can be replaced by fluorine, and $A^5$ is a benzene ring;
$Z^1$ to $Z^4$ are each independently a single bond or —C≡C—; and
$n^1$ and $n^2$ are 1 and $n^3$ is 0;
the compound 2 is represented by the following general formula (3):

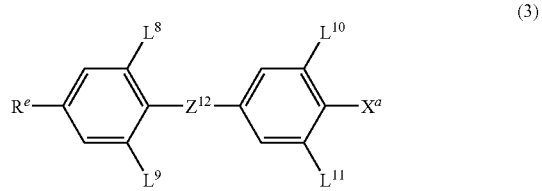
(3)

wherein:
$R^e$ is alkyl having 1 to 10 carbon atoms, wherein any —$CH_2$— in the alkyl can be replaced by —O—, —CH=CH— or —C≡C—;
$X^a$ is fluorine or —CN;
$Z^{12}$ is —COO—; and $L^8$ to $L^{11}$ are each independently hydrogen or fluorine, wherein at least two of them are fluorine, and at least one of $L^{10}$ and $L^{11}$ is fluorine;

the chiral dopants comprise one or more compounds represented by the following formulae (K2-5) to (K2-8):

(K2-5)
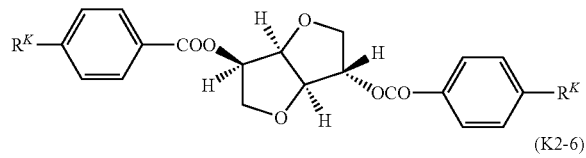

(K2-6)
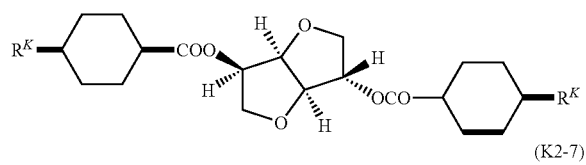

(K2-7)
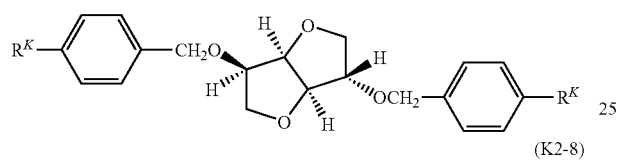

(K2-8)
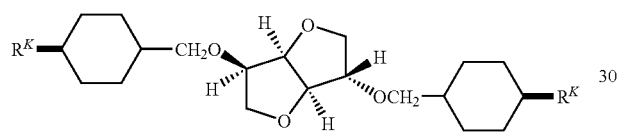

wherein each $R^K$ is independently alkyl having 3 to 10 carbon atoms, wherein —$CH_2$— adjacent to the ring in the alkyl can be replaced by —O—, and any —$CH_2$— in the alkyl can be replaced by —CH=CH—;

the clearing point $T_1$, the clearing point $T_2$ and the clearing point Tx of the liquid crystal composition satisfy the following conditions:

$T_1 > T_2$ $T_1 - Tx \geq 150°$ C.; and an optically isotropic liquid crystal phase has an optically isotropic phase which shows diffracted light with two or more colors.

[30] A liquid crystal composition, which comprises a compound 1 having the clearing point $T_1$, a compound 2 having the clearing point $T_2$ and chiral dopants, and whose clearing point is Tx, wherein:

the liquid crystal composition comprises 20 to 40 wt % of compound 1, 20 to 60 wt % of compound 2, and 5 to 25 wt % of chiral dopants;

the compound I is represented by the following general formula (1):

(1)
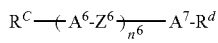

wherein:
$R^a$ is alkyl having 1 to 10 carbon atoms, wherein any —$CH_2$— in the alkyl can be replaced by —O—;
$R^b$ is halogen, —CN, —N=C=O, —N=C=S, —$CF_3$, or —$OCF_3$;

$A^1$ to $A^4$ are each independently a benzene ring, a dioxane ring or a cyclohexane ring, wherein any hydrogen in the benzene ring can be replaced by fluorine, and $A^5$ is a benzene ring;

$Z^1$ to $Z^4$ are each independently a single bond or —C≡C—; and $n^1$ is 1, and $n^2$ and $n^3$ are 0;

the compound 2 consists of a compound represented by the following general formula (2) and a compound represented by the following general formula (3), (2)
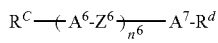

wherein in the formula (2):
$R^c$ is alkyl having 1 to 10 carbon atoms, wherein any —$CH_2$— in the alkyl can be replaced by —O—;
$R^d$ is halogen or —CN;
$A^6$ is a benzene ring or a cyclohexane ring, wherein any hydrogen in these rings can be replaced by fluorine, and $A^7$ is a benzene ring;
$Z^6$ is a single bond or —COO—; and
$n^6$ is 1, (3)
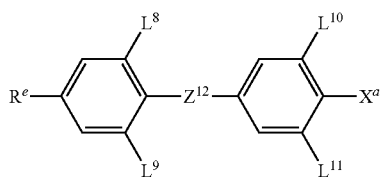

and wherein in the formula (3):
$R^e$ is alkyl having 1 to 10 carbon atoms, wherein any —$CH_2$— in the alkyl can be replaced by —O—, —CH=CH— or —C≡C—;
$X^a$ is fluorine or —CN;
$Z^{12}$ is —COO—; and
$L^8$ to $L^{11}$ are each independently hydrogen or fluorine, wherein at least two of them are fluorine, and at least one of $L^{10}$ and $L^{11}$ is fluorine, and wherein the chiral dopants comprise one or more compounds represented by the following formulae (K2-5) to (K2-8):

(K2-5)
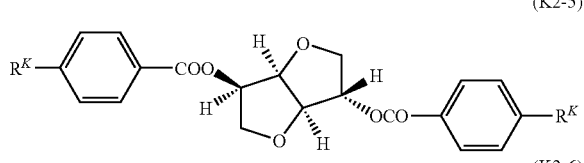

(K2-6)
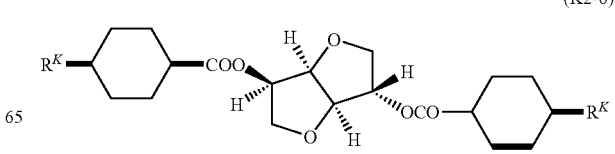

-continued

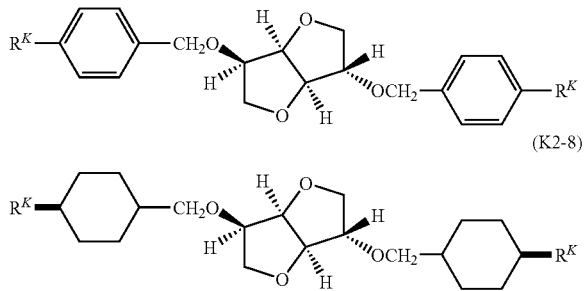

(K2-7)

(K2-8)

wherein each $R^K$ is independently alkyl having 3 to 10 carbon atoms, wherein —CH$_2$— adjacent to the ring in the alkyl can be replaced by —O—, and any —CH$_2$— in the alkyl can be replaced by —CH=CH—;

the clearing point $T_1$, the clearing point $T_2$ and the clearing point Tx of the liquid crystal composition satisfy the following conditions:

$T_1 > T_2$ $T_1 - Tx \geqq 100°$ C.; and an optically isotropic liquid crystal phase has an optically isotropic phase which does not show diffracted light with two or more colors.

[31] A liquid crystal element, in which an electrode is placed on one or both surfaces thereof, and which has a liquid crystal composition placed between substrates and an electric field applying means for applying electric field on the liquid crystal composition via the electrode, wherein the liquid crystal composition is that according to any one of items [1] to [30].

[32] A liquid crystal element, in which an electrode is placed on one or both surfaces thereof, and which has: a pair of substrates, at least one of which is transparent; a liquid crystal composition placed between the substrates; and polarization plates placed on the external sides of the substrates, and which has an electric field applying means for applying electric field on the liquid crystal composition via the electrode, wherein the liquid crystal composition is that according to any one of items [1] to [30].

[33] The liquid crystal element according to item [32], wherein the electrode is constituted on at least one of the pair of substrates so that electric field can be applied in at least two directions.

[34] The liquid crystal element according to item [32], wherein the electrode is constituted on one or both of the pair of substrates placed in parallel with each other so that electric field can be applied in at least two directions.

[35] The liquid crystal element according to any one of items [31] to [34], wherein: the electrode is placed in a matrix state to constitute a pixel electrode; each pixel has an active element; and the active element is a thin film transistor (TFT).

[36] A liquid crystal composition, which comprises a compound 1 having the clearing point $T_1$ and a compound 2 having the clearing point $T_2$, and whose clearing point is Tx, the liquid crystal composition being used in an element driven in a state of an optically isotropic liquid crystal phase,
wherein:
the liquid crystal composition comprises 10 to 80 wt % of compound 1 and 20 to 90 wt % of compound 2; and the clearing point $T_1$, the clearing point $T_2$ and the clearing point Tx of the liquid crystal composition satisfy the following conditions:

$T_1 > T_2$ $T_1 - Tx \geqq 100°$ C.

[37] A liquid crystal composition, which is a component of a liquid crystal composition used in an element driven in a state of an optically isotropic liquid crystal phase, wherein the difference between the upper limit and the lower limit of a temperature allowing coexistence of a chiral nematic phase and a non-liquid crystalline isotropic phase is 3° C. to 150° C.

[38] The liquid crystal composition according to item [36], wherein the difference between the upper limit and the lower limit of a temperature allowing coexistence of a chiral nematic phase and a non-liquid crystalline isotropic phase is 3° C. to 150° C.

[39] The liquid crystal composition according to item [36] or [38],
wherein:
the compound 1 is represented by the following general formula (1):

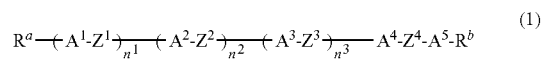

wherein:
$R^a$ is hydrogen or alkyl having 1 to 20 carbon atoms, wherein any —CH$_2$— in the alkyl can be replaced by —O—, —S—, —COO—, —OCO—, —CH=CH—, —CF=CF—, or —C≡C—, and any hydrogen in the alkyl group can be replaced by halogen;
$R^b$ is hydrogen, halogen, —CN, —N=C=O, —N=C=S, —CF$_3$, —OCF$_3$, or alkyl having 1 to 20 carbon atoms, wherein: any —CH$_2$— in the alkyl can be replaced by —O—, —S—, —COO—, —OCO—, —CH=CH—, —CF=CF—, or —C≡C—; any hydrogen in the alkyl can be replaced by halogen; and —CH$_3$ in the alkyl can be replaced by —CN;
$A^1$ to $A^5$ are each independently an aromatic or nonaromatic 3- to 8-membered ring or a condensed ring having 9 or more carbon atoms, wherein: any hydrogen in these rings can be replaced by halogen, alkyl having 1 to 3 carbon atoms or alkyl halide having 1 to 3 carbon atoms; any —CH$_2$— in the rings can be replaced by —O—, —S—, or —NH—; any —CH= in the rings can be replaced by —N=; and $A^1$ to $A^5$ are not tetrahydropyran rings;
$Z^1$ to $Z^4$ are each independently a single bond or alkylene having 1 to 8 carbon atoms, wherein any —CH$_2$— in the alkylene can be replaced by —O—, —S—, —COO—, —OCO—, —CSO—, —OCS—, —N=N—, —CH=N—, —N=CH—, —N(O)=N—, —N=N(O)—, —CH=CH—, —CF=CF— or —C≡C—, and any hydrogen can be replaced by halogen; and
$n^1$ to $n^3$ are each independently 0 or 1; when $R^b$ is hydrogen or fluorine, $n^2$ and $n^3$ are 1; when $Z^4$ is —COO—, $n^2$ and $n^3$ are 1; and only when at least one of $A^4$ and $A^5$ is a condensed ring having 9 or more carbon atoms, all of $n^1$ to $n^3$ can be 0; and
the clearing point of the compound is 150° C. to 400° C.

[40] The liquid crystal composition according to item [36], [38] or [39], wherein the compound 2 is represented by the following general formula (2):

(2)

wherein:

$R^c$ is hydrogen or alkyl having 1 to 20 carbon atoms, wherein any —$CH_2$— in the alkyl can be replaced by —O—, —S—, —COO—, —OCO—, —CH=CH—, —CF=CF— or —C≡C—, and any hydrogen in the alkyl can be replaced by halogen;

$R^d$ is halogen, —CN, —N=C=O, —N=C=S, —$CF_3$, —$OCF_3$, —C≡C—CN, or —C≡C—$CF_3$;

$A^6$ and $A^7$ are each independently an aromatic or nonaromatic 3- to 8-membered ring or a condensed ring having 9 or more carbon atoms, wherein any hydrogen in the rings can be replaced by halogen, alkyl having 1 to 3 carbon atoms or alkyl halide having 1 to 3 carbon atoms; any —$CH_2$— in the rings can be replaced by —O—, —S—, or —NH—; and any —CH= in the rings can be replaced by —N=;

$Z^6$ is a single bond or alkylene having 1 to 8 carbon atoms, wherein any —$CH_2$— in the alkylene can be replaced by —O—, —S—, —COO—, —OCO—, —CSO—, —OCS—, —N=N—, —CH=N—, —N=CH—, —N(O)=N—, —N=N(O)—, —CH=CH—, —CF=CF— or —C≡C—, and any hydrogen in the alkylene can be replaced by halogen; and $n^6$ is 0 or 1; and when A is a condensed ring having 9 or more carbon atoms, $n^6$ is 0.

[41] The liquid crystal composition according to any one of items [36] and [38] to [40], wherein the compound 2 is represented by the following general formula (3):

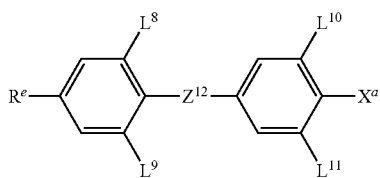

(3)

wherein:

$R^e$ is alkyl having 1 to 10 carbon atoms, wherein any —$CH_2$— in the alkyl can be replaced by —O—, —S—, —COO—, —OCO—, —CH=CH—, —CF=CF— or —C≡C—, and any hydrogen in the alkyl can be replaced by halogen;

$X^a$ is fluorine, chlorine, —CN, —N=C=S, —$CF_3$, —C≡C—CN or —C≡C—$CF_3$;

$Z^{12}$ is a single bond, —COO— or —C≡C—; and $L^8$ to $L^{11}$ are each independently hydrogen or fluorine.

The liquid crystal composition of the preferred embodiment of the invention can exhibit an optically isotropic liquid crystal phase in a wide temperature range without substantially including a high-molecular substance. Moreover, a large electric birefringence (including the Kerr effect with a high Kerr constant) can be observed in the liquid crystal composition of the preferred embodiment of the invention. Furthermore, the response time of the liquid crystal composition of the preferred embodiment of the invention is very short, and the composition can be homochromatic. In the liquid crystal composition of the preferred embodiment of the invention, birefringence, which remains even if returning to a state, in which electric field is not applied, after application of high electric field, can be reduced. Further, the liquid crystal composition of the preferred embodiment of the invention can be suitably used for liquid crystal elements such as display elements and the like based on these effects.

BEST MODE FOR CARRYING OUT THE INVENTION

Figure 1:
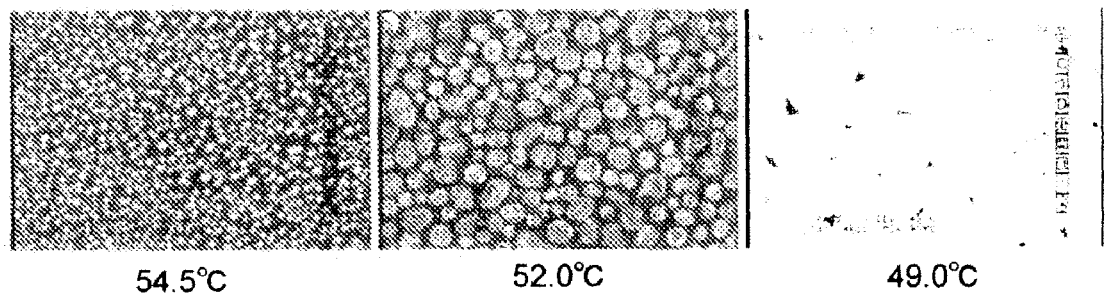
FIG. 1 shows polarization microscope images of liquid crystal composition B-2 in the lowered temperature process.

The liquid crystal composition of the invention is an optically isotropic liquid crystal composition used in an element driven in a state of an optically isotropic liquid crystal phase. That is, the liquid crystal composition of the invention is a liquid crystal composition used in a liquid crystal element, and the liquid crystal composition can be used in a liquid crystal element in a liquid crystal phase showing optically isotropic property (e.g., a blue phase).

A liquid crystal composition which exhibits a nematic phase (except for a chiral nematic phase) does not exhibit an optically isotropic liquid crystal phase at any temperature. Therefore, the liquid crystal composition of the invention is a composition which does not exhibit the nematic phase at any temperature.

Further, the nematic phase and the chiral nematic phase are not optically isotropic phases. Therefore, the liquid crystal composition of the invention used in an element driven in the state of the optically isotropic liquid crystal phase does not include liquid crystal compositions used in elements driven in the state of the nematic phase or the chiral nematic phase.

For example, the liquid crystal composition of the invention is a liquid crystal composition A, which is obtained by mixing a compound 1 represented by formula (1) and a compound 2 represented by formula (2) or (3), or a liquid crystal composition B, which is obtained by further adding a specific amount of chiral dopants to the composition, and which exhibits an optically isotropic liquid crystal phase. However, the liquid crystal composition A may contain chiral dopants in a range in which an optically isotropic liquid crystal phase is not exhibited.

In the liquid crystal composition A of the invention, the compound 1 may consist of one compound represented by formula (1) or a plurality of compounds represented by formula (1). Similarly, the compound 2 may consist of one compound represented by formula (2) or (3) or a plurality of compounds represented by formula (2) or (3).

Further, in the specification, the liquid crystal composition refers to a composition having a liquid crystal phase or a composition which does not significantly decrease the liquid crystal phase-non-liquid crystalline isotropic phase transition temperature when mixed with a liquid crystal material.

When a liquid crystalline compound or a liquid crystalline composition does not exhibit the liquid crystal phase, a method for calculating a liquid crystal phase-non-liquid crystalline isotropic phase transition point using an extrapolation method is employed as described below. This extrapolation method can be applied to a compound or a composition whose liquid crystal phase-non-liquid crystalline isotropic phase transition point is higher than the decomposition temperature of liquid crystal.

1. Liquid Crystal Composition A

1.1. Clearing Point

In the liquid crystal composition A of the invention, the clearing points ($T_1$) and ($T_2$) of the compounds 1 and 2 contained in the liquid crystal composition A and the clearing point (Tx) of the liquid crystal composition A preferably satisfy the following formulae:

$$T_1 > T_2$$

$$T_1 - Tx \geq 100° \text{ C.}$$

More preferably, these clearing points satisfy the following formulae:

$$T_1 > T_2$$

$$T_1 - Tx \geq 150° \text{ C.}$$

In this regard, the clearing point means a temperature at which a compound or composition exhibits a non-liquid crystalline isotropic phase in the elevated temperature process. Specific examples of clearing points include N-I point, which is a phase transition point from a nematic phase to a non-liquid crystalline isotropic phase. In the case of the liquid crystal composition of the invention, a coexisting state of a non-liquid crystalline isotropic phase and a liquid crystal phase may be exhibited. In this case, a temperature at which a non-liquid crystalline isotropic phase is initially appeared in the elevated temperature process is defined as a clearing point. Further, a clearing point of a compound which does not exhibit a liquid crystal phase, i.e., a compound having K-I point, is K-I point or lower. According to need, the method for calculating a liquid crystal phase-non-liquid crystalline isotropic phase transition point using the extrapolation method as described below can be employed.

1.2. Compound 1

The compound 1 preferably has a relatively high clearing point. Specifically, the compound 1 is preferably a compound represented by formula (1). In formula (1): $R^a$ is hydrogen or alkyl having 1 to 20 carbon atoms; any —$CH_2$— in the alkyl can be replaced by —O—, —S—, —COO—, —OCO—, —CH=CH—, —CF=CF— or —C≡C—; and any hydrogen in the alkyl group can be replaced by halogen. Among them, $R^a$ is preferably alkyl having 1 to 10 carbon atoms, and any —$CH_2$— in the alkyl can be replaced by —O—, —S—, —COO—, —OCO—, —CH=CH— or —C≡C—. More preferably, $R^a$ is alkyl having 1 to 10 carbon atoms, and any —$CH_2$— in the alkyl can be replaced by —CH=CH— or —C≡C—. Among them, $R^a$ is most preferably alkyl having 1 to 10 carbon atoms or alkoxy.

In formula (1): $R^b$ is hydrogen, halogen, —CN, —N=C=O, —N=C=S, —$CF_3$, —$OCF_3$ or alkyl having 1 to 20 carbon atoms; any —$CH_2$— in the alkyl can be replaced by —O—, —S—, —COO—, —OCO—, —CH=CH—, —CF=CF— or —C≡C—; any hydrogen in the alkyl can be replaced by halogen; and —$CH_3$ in the alkyl can be replaced by —CN. Among them, $R^b$ is preferably halogen, —CN, —N=C=O, —N=C=S, —$CF_3$, —$OCF_3$ or alkyl having 1 to 20 carbon atoms; any —$CH_2$— in the alkyl can be replaced by —O—, —CH=CH— or —C≡C—; any hydrogen in the alkyl can be replaced by halogen; and —$CH_3$ in the alkyl can be replaced by —CN. $R^b$ is more preferably fluorine, chlorine, —CN, —N=C=S or alkyl having 1 to 20 carbon atoms, and any —$CH_2$— in the alkyl can be replaced by —O—, —CH=CH— or —C≡C—.

In formula (1), $A^1$ to $A^5$ are each independently an aromatic or nonaromatic 3- to 8-membered ring or a condensed ring having 9 or more carbon atoms, wherein: any hydrogen in these rings can be replaced by halogen, alkyl having 1 to 3 carbon atoms or alkyl halide having 1 to 3 carbon atoms; any —$CH_2$— in the rings can be replaced by —O—, —S— or —NH—; any —CH= in the rings can be replaced by —N=; and $A^1$ to $A^5$ are not tetrahydropyran rings. Among them, preferably, $A^1$ to $A^5$ are each independently a benzene ring, a naphthalene ring, a dioxane ring or a cyclohexane ring, wherein any hydrogen in these rings can be replaced by halogen, alkyl having 1 to 3 carbon atoms or alkyl halide having 1 to 3 carbon atoms, and any —$CH_2$— in the rings can be replaced by —O— or —S—, and any —CH= can be replaced by —N=. More preferably, $A^1$ to $A^5$ are each independently a benzene ring, a naphthalene ring, a dioxane ring or a cyclohexane ring, wherein any hydrogen in the benzene ring or the naphthalene ring can be replaced by fluorine, chlorine, methyl or methyl halide; any —$CH_2$— can be replaced by —O— or —S—; and any —CH= can be replaced by —N=. Among them, most preferably, $A^1$ to $A^5$ are each independently a benzene ring, a dioxane ring or a cyclohexane ring, wherein any hydrogen in the benzene ring can be replaced by fluorine.

In formula (1), $Z^1$ to $Z^4$ are each independently a single bond or alkylene having 1 to 8 carbon atoms, wherein any —$CH_2$— in the alkylene can be replaced by —O—, —S—, —COO—, —OCO—, —CSO—, —OCS—, —N=N—, —CH=N—, —N=CH—, —N(O)=N—, —N=N(O)—, —CH=CH—, —CF=CF— or —C≡C—, and any hydrogen can be replaced by halogen. Among them, preferably, $Z^1$ to $Z^4$ are each independently a single bond or alkylene having 1 to 4 carbon atoms, wherein any —$CH_2$— in the alkylene can be replaced by —O—, —S—, —COO—, —OCO—, —CSO—, —OCS—, —CH=CH—, —CF=CF— or —C≡C—, and any hydrogen can be replaced by halogen. More preferably, $Z^1$ to $Z^4$ are each independently a single bond or —C≡C—.

In formula (1), $n^1$ to $n^3$ are each independently 0 or 1, wherein: $n^2$ and $n^3$ are 1 when $R^b$ is hydrogen or fluorine; $n^2$ and $n^3$ are 1 when $Z^4$ is —COO—; and all of $n^1$ to $n^3$ may be 0 only when at least one of $A^4$ and $A^5$ is a condensed ring having 9 or more carbon atoms. Among them, preferably, $n^1$ to $n^3$ are each independently 0 or 1, wherein $n^2$ and $n^3$ are 1 when $R^b$ is hydrogen or fluorine, and all of $n^1$ to $n^3$ may be 0 only when at least one of $A^4$ and $A^5$ is a condensed ring having 9 or more carbon atoms. Among them, more preferably, $n^1$ to $n^3$ are each independently 0 or 1, wherein $n^2$ and $n^3$ are 1 when $R^b$ is hydrogen or fluorine, and all of $n^1$ to $n^3$ may be 0 only when at least one of $A^4$ and $A^5$ is a condensed ring having 9 or more carbon atoms.

The compound represented by formula (1) preferably has a clearing point of 150° C. to 400° C., and more preferably has a clearing point of 200° C. to 350° C. When the clearing point is lower than 150° C., it is disadvantageous in terms of satisfying the relation between the clearing point of the compound 1 ($T_1$) and the clearing point of the liquid crystal composition A (Tx) ($T_1 - Tx \geq 100°$ C.). When the clearing point is higher than 400° C., the compatibility may be decreased depending on other compounds to be combined therewith, and the lower limit of temperature of the liquid crystal phase may be raised, wherein crystal is separated out at a low temperature.

1.3. Compound 2

The compound 2 preferably has a low clearing point and a large value of dielectric anisotropy. Specifically, the compound 2 is preferably represented by formula (2) or (3).

1.3.1. Compound Represented by Formula (2)

In formula (2), $R^c$ is hydrogen or alkyl having 1 to 20 carbon atoms, wherein any —$CH_2$— in the alkyl can be replaced by —O—, —S—, —COO—, —OCO—, —CH=CH—, —CF=CF— or —C≡C—, and any hydrogen in the alkyl can be replaced by halogen. Among them, preferably, $R^c$ is alkyl having 1 to 10 carbon atoms, wherein any —CH$_2$— in the alkyl can be replaced by —O—, —S—, —COO—, —OCO—, —CH=CH— or —C≡C—. More preferably, $R^c$ is alkyl having 1 to 10 carbon atoms, wherein any —CH$_2$— in the alkyl can be replaced by —O—, —CH=CH— or —C≡C—. Most preferably, $R^c$ is alkyl having 1 to 10 carbon atoms, wherein any —CH$_2$— in the alkyl can be replaced by —O—.

In formula (2), $R^d$ is halogen, —CN, —N=C=O, —N=C=S, —CF$_3$, —OCF$_3$, —C≡C—CN or —C≡C—CF$_3$. Among them, $R^d$ is preferably halogen, —CN, —N=C=S, —CF$_3$, —C≡C—CN or —C≡C—CF$_3$.

In formula (2), $A^6$ and $A^7$ are each independently an aromatic or nonaromatic 3- to 8-membered ring or a condensed ring having 9 or more carbon atoms, wherein any hydrogen in these rings can be replaced by halogen, alkyl having 1 to 3 carbon atoms or alkyl halide having 1 to 3 carbon atoms; any —CH$_2$— in the rings can be replaced by —O—, —S— or —NH—; and any —CH= can be replaced by —N=.

Among them, more preferably, $A^6$ and $A^7$ are each independently a benzene ring, a naphthalene ring or a cyclohexane ring, wherein any hydrogen in these rings can be replaced by halogen, alkyl having 1 to 3 carbon atoms or alkyl halide having 1 to 3 carbon atoms; any —CH$_2$— in the rings can be replaced by —O— or —S—; and any —CH= can be replaced by —N=. Even more preferably, $A^6$ and $A^7$ are each independently a benzene ring, a naphthalene ring or a cyclohexane ring, wherein any hydrogen in these rings can be replaced by fluorine, chlorine, methyl or methyl halide; any —CH$_2$— in the rings can be replaced by —O— or —S—; and any —CH= can be replaced by —N=. Most preferably, $A^6$ and A7 are each independently a benzene ring, a dioxane ring or a cyclohexane ring, wherein any hydrogen in the benzene ring can be replaced by fluorine.

In formula (2), $Z^6$ is a single bond or alkylene having 1 to 8 carbon atoms, wherein any —CH$_2$— in the alkylene can be replaced by —O—, —S—, —COO—, —OCO—, —CSO—, —OCS—, —N=N—, —CH=N—, —N=CH—, —N(O)=N—, —N=N(O)—, —CH=CH—, —CF=CF— or —C≡C—, and any hydrogen in the alkylene can be replaced by halogen. Among them, $Z^6$ is preferably a single bond or alkylene having 1 to 4 carbon atoms, wherein any —CH$_2$— in the alkylene can be replaced by —O—, —S—, —COO—, —OCO—, —CSO—, —OCS—, —CH=CH—, —CF=CF— or —C≡C—, and any hydrogen in the alkylene can be replaced by halogen. $Z^6$ is more preferably a single bond, —COO—, —CF$_2$O— or —C≡C—. Most preferably, $Z^6$ is a single bond or —COO—.

In formula (2), $n^6$ is 0 or 1, wherein n6 is 0 when $A^7$ is a condensed ring having 9 or more carbon atoms. Among them, preferably, $n^6$ is 0 or 1, wherein $n^6$ is 0 when $A^7$ is a naphthalene ring. More preferably, $n^6$ is 0 or 1, wherein $n^6$ is 0 when $A^7$ is a naphthalene ring. Most preferably, $n^6$ is 0 or 1.

1.3.2. Compound Represented by Formula (3)

In formula (3), Re is alkyl having 1 to 10 carbon atoms, wherein any —CH$_2$— in the alkyl can be replaced by —O—, —S—, —COO—, —OCO—, —CH=CH—, —CF=CF— or —C≡C—, and any hydrogen in the alkyl can be replaced by halogen. Among them, $R^e$ is preferably alkyl having 1 to 10 carbon atoms, wherein any —CH$_2$— in the alkyl can be replaced by —O—, —CH=CH— or —C≡C—.

In formula (3), $X^a$ is fluorine, chlorine, —CN, —N=C=S, —CF$_3$, —C≡C—CN or —C≡C—CF$_3$.

In formula (3), $Z^{12}$ is a single bond, —COO— or —C≡C—, and among them, —COO— is preferable.

In formula (3), $L^8$ to $L^{11}$ are each independently hydrogen or fluorine. Among them, preferably, $L^8$ to $L^{11}$ are each independently hydrogen or fluorine, wherein at least two of them are fluorine.

1.4. Weight Ratio

When the clearing point of the compound 1 is 150 to 250° C., preferably, the compound 1 is contained in an amount of 10 to 80 wt % and the compound 2 is contained in an amount of 20 to 90 wt % in the liquid crystal composition A. More preferably, the compound 1 is contained in an amount of 30 to 60 wt % and the compound 2 is contained in an amount of 30 to 70 wt %. When the clearing point of the compound 1 is 250 to 400° C., preferably, the compound 1 is contained in an amount of 5 to 70 wt % and the compound 2 is contained in an amount of 30 to 95 wt % in the liquid crystal composition A. As described above, a plurality of compounds represented by formula (1) can be contained in the liquid crystal composition of the invention as the compound 1, and similarly, a plurality of compounds represented by formula (2) can be contained as the compound 2. Therefore, for example, when a plurality of compounds represented by formula (1) are contained, the total amount of the compounds represented by formula (1) is 10 to 80 wt % (or 5 to 70 wt %).

1.5. Temperature Range Allowing Coexistence of the (Chiral) Nematic Phase and the Non-Liquid Crystalline Isotropic Phase The liquid crystal composition A is a liquid crystal composition, which exhibits the coexistence state of the nematic phase and the non-liquid crystalline isotropic phase in the lowered temperature process when no chiral dopant is contained, and which exhibits the coexistence state of the chiral nematic phase and the non-liquid crystalline isotropic phase in the lowered temperature process when the chiral dopants are contained. Further, the liquid crystal composition A is a composition which does not exhibit an optically isotropic liquid crystal phase. The coexistence state of the (chiral) nematic phase and the non-liquid crystalline isotropic phase can be confirmed, for example, by observation using a polarization microscope. These coexistence states are not caused by temperature gradient with respect to the liquid crystal composition.

In the liquid crystal composition of the invention, with respect to the liquid crystal composition A which allows coexistence of the (chiral) nematic phase and the non-liquid crystalline isotropic phase, a temperature range allowing coexistence of the (chiral) nematic phase and the non-liquid crystalline isotropic phase is preferably wide. Specifically, the difference between the upper limit and the lower limit of a temperature allowing the coexistence of these phases is more preferably 3 to 150° C. When the temperature range allowing the coexistence of these phases is wide, the liquid crystal composition B, which is obtained by further adding the chiral dopants, tends to have an optically isotropic liquid crystal phase in a wide temperature range.

When the chiral dopants are added to the liquid crystal composition A, in which the nematic phase and the non-liquid crystalline isotropic phase coexist in a wide temperature range, and which does not comprise the chiral dopants, the liquid crystal composition A, in which the chiral nematic phase and the non-liquid crystalline isotropic phase coexist in a wide temperature range, can be easily obtained.

The pitch of the chiral nematic phase, which does not coexist with the non-liquid crystalline isotropic phase in the liquid crystal composition A, is 700 nm or more. As described later, when the chiral dopants are added, the liquid crystal composition B having a shorter pitch can be obtained.

2. Liquid Crystal Composition B

2.1. Composition of the Liquid Crystal Composition B

The liquid crystal composition B is a composition which exhibits an optically isotropic liquid crystal phase. For example, the liquid crystal composition B can be obtained by further adding the chiral dopants to the liquid crystal composition A.

A liquid crystal composition, in which the chiral dopants are added in an amount of 1 to 40 wt %, preferably in an amount of 5 to 15 wt % of the total weight of the liquid crystal composition B, tends to have an optically isotropic liquid crystal phase, and therefore is preferable, though it depends on the composition of the liquid crystal composition A, the type of the chiral dopants to be further added and the like.

In the step of producing the liquid crystal composition B, which is characterized by addition of the chiral dopants to the liquid crystal composition A, the chiral dopants which can be contained in the liquid crystal composition A in advance and the chiral dopants which are further added in order to obtain the liquid crystal composition B may be the same or different.

2.2. Chiral Dopant

The chiral dopants contained in the liquid crystal composition B is preferably a compound having a strong helical twisting power. In the case of a compound having a strong helical twisting power, an adding amount thereof required to obtain a desired pitch can be decreased, and therefore increase in drive voltage can be suppressed, and it is practically advantageous. Specifically, compounds represented by the above-described formulae (K1) to (K5) are preferable.

In formulae (K1) to (K5): each $R^K$ is independently hydrogen, halogen, —CN, —N=C=O, —N=C=S or alkyl having 1 to 20 carbon atoms, wherein any —$CH_2$— in the alkyl can be replaced by —O—, —S—, —COO—, —OCO—, —CH=CH—, —CF=CF— or —C≡C—, and any hydrogen in the alkyl can be replaced by halogen; each A is independently an aromatic or nonaromatic 3- to 8-membered ring or a condensed ring having 9 or more carbon atoms, wherein any hydrogen in these rings can be replaced by halogen, alkyl having 1 to 3 carbon atoms or haloalkyl having 1 to 3 carbon atoms; any —$CH_2$— can be replaced by —O—, —S— or —NH—, and any —CH= can be replaced by —N=; each Z is independently a single bond or alkylene having 1 to 8 carbon atoms, wherein any —$CH_2$— can be replaced by —O—, —S—, —COO—, —OCO—, —CSO—, —OCS—, —N=N—, —CH=N—, —N=CH—, —N(O)=N—, —N=N(O)—, —CH=CH—, —CF=CF— or —C≡C—, and any hydrogen can be replaced by halogen; X is a single bond, —COO—, —$CH_2O$—, —$CF_2O$— or —$CH_2CH_2$—; and m is 1 to 4.

Among them, the chiral dopants added to the liquid crystal composition B are preferably represented by formulae (K2-1) to (K2-8) included in formula (K2) and formulae (K5-1) to (K5-3) included in formula (K5) (in the formulae, each $R^K$ is independently alkyl having 3 to 10 carbon atoms, wherein —$CH_2$— adjacent to the ring in the alkyl can be replaced by —O—, and any —$CH_2$— can be replaced by —CH=CH—).

The chiral dopants are contained preferably in an amount of 1 to 40 wt %, more preferably in an amount of 3 to 25 wt %, and most preferably in an amount of 5 to 15 wt % of the total weight of the liquid crystal composition B.

2.3. Optically Isotropic Liquid Crystal Phase

The liquid crystal composition B has an optically isotropic liquid crystal phase. "A liquid crystal composition has optical isotropy" means that the composition shows optically isotropic nature since liquid crystal molecular alignment is macroscopically isotropic, but liquid crystalline order is microscopically present. The pitch based on the liquid crystalline order, which the liquid crystal composition B microscopically has, is preferably 700 nm or less, more preferably 500 nm or less, and most preferably 350 nm or less.

The term "non-liquid crystalline isotropic phase" means a generally-defined isotropic phase, i.e., a disordered phase, wherein, if the phase is generated by a region whose local order parameter is not zero, the cause thereof is fluctuation. For example, an isotropic phase which is exhibited in the high temperature side of the nematic phase corresponds to the non-liquid crystalline isotropic phase in the specification. The same definition is applied to the chiral liquid crystal in the specification. Further, the term "optically isotropic liquid crystal phase" as used herein refers to a phase which exhibits an optically isotropic (not fluctuant) liquid crystal phase. Examples thereof include a phase which exhibits a platelet texture (blue phase in a limited sense).

Regarding the liquid crystal composition B of the invention, a platelet texture, which is typically found in a blue phase, is sometimes not observed in a liquid crystal phase by means of a polarization microscope though it is optically isotropic. For this reason, in the specification, only phases which exhibit a platelet texture are referred to as "blue phase" (blue phase in a limited sense), and they are distinguished from optically isotropic liquid crystal phases which do not show diffracted light with two or more colors.

In general, the blue phase is classified into three types (blue phase I, blue phase II and blue phase III). All of the three types of blue phases are optically active and isotropic. In the blue phases I and II, 2 or more types of diffracted lights attributed to Bragg reflections from different lattice planes are observed.

A state in which an optically isotropic liquid crystal phase does not show diffracted light with two or more colors means that a platelet texture, which is observed in blue phases I and II, is not observed in the phase, and that the phase is generally in one color. In optically isotropic liquid crystal phases which do not show diffracted light with two or more colors, uniformity of color tone is not required.

Optically isotropic liquid crystal phases which do not show diffracted light with two or more colors have the advantages that the intensity of reflected light caused by Bragg reflection is suppressed and that it is shifted to the low-wavelength side.

Further, the problem of color is sometimes raised when a liquid crystal material which reflects visible light is utilized as a display element. However, in the case of liquid crystal which does not show diffracted light with two or more colors, reflection wavelength is shifted to the low-wavelength side, and therefore reflection of visible light is allowed to disappear with a pitch that is longer than that of the blue phase in the limited sense (a phase which exhibits a platelet texture).

The longer the pitch, the larger the electric birefringence of the optically isotropic liquid crystal phase. Therefore, the electric birefringence can be increased. In this state, when electric field is applied to the liquid crystal composition B, rapid response without residual image can be obtained.

3. Others

Other compounds such as high-molecular substances can be further added to the liquid crystal composition of the invention in a range in which properties of the composition is not affected thereby. The liquid crystal composition of the invention may contain, for example, a dichroism pigment, a photochromic compound or the like in addition to the high-molecular substances.

Positive/negative of the dielectric anisotropy of the liquid crystal composition of the invention is not particularly limited, but positive is preferable. With respect to the absolute value of the value of dielectric anisotropy of the liquid crystal material (Δ∈) and the value of optical anisotropy (Δn), the higher these values, the higher the electric birefringence, and therefore these values are preferably as high as possible.

EXAMPLES

The following examples are for illustrative purposes only and are not intended, nor should they be interpreted to, limit the scope of the invention.

In the examples of the specification, "K" represents the crystal phase; "I" represents the non-liquid crystalline isotropic phase; "N" represents the nematic phase; "N*" represents the chiral nematic phase; "BP" represents the blue phase; and "BPX" represents the optically isotropic liquid crystal phase in which diffracted light with two or more colors is not observed. Coexistence state of two phases is sometimes described in the following form: (N*+I), (N*+BPX), etc. Specifically, (N*+I) represents a phase in which the non-liquid crystalline isotropic phase and the chiral nematic phase coexist, and (N*+BPX) represents a phase, in which the optically isotropic liquid crystal phase in which diffracted light with two or more colors is not observed and the chiral nematic phase coexist. "Un" represents an unconfirmed phase which is not optically isotropic.

In the specification, I-N phase transition point is sometimes referred to as N-I point, and I-N* transition point is sometimes referred to as N*-I point. Further, I-BP phase transition point is sometimes referred to as BP-I point.

In the examples of the specification, measurement/calculation of values of physical properties and the like is made according to the method described in the Standard of Electronic Industries Association of Japan, EIAJ• ED-2521A, unless otherwise indicated. Specific methods of measurement, calculation and the like are as described below.

Phase Transition Point

A sample was placed on a hotplate of a melting-point measuring apparatus equipped with a polarization microscope. Initially, under crossed nicols, temperature was elevated to the point at which the sample becomes the non-liquid crystalline isotropic phase, and thereafter temperature was lowered at the rate of 1° C./minute, and the chiral nematic phase or the optically anisotropic phase was allowed to be completely exhibited. Phase transition temperature in the process was measured. Next, temperature was elevated at the rate of 1° C./minute, and phase transition temperature in this process was measured. When it was difficult to determine the phase transition point in the optically isotropic liquid crystal phase in dark field under crossed nicols, a polarization plate was inclined at an angle of 1 to 10° from the state of the crossed nicols to measure the phase transition temperature.

Method for Calculating a Liquid Crystal Phase-Non-Liquid Crystalline Isotropic Phase Transition Point Using an Extrapolation Method A nematic liquid crystal composition consisting of 85 wt % of mother liquid crystal exhibiting the nematic phase and 15 wt % of liquid crystalline compound or liquid crystalline composition is prepared. Linear extrapolation was made using the liquid crystal phase-non-liquid crystalline isotropic phase transition points of the mother liquid crystal and the liquid crystalline compound or liquid crystalline composition to determine the liquid crystal phase-non-liquid crystalline isotropic phase transition point of the liquid crystalline compound or the liquid crystalline composition.

Lower Limit of Temperature of Nematic Phase (TC; ° C.)

A sample having the nematic phase was put into a glass bottle, and it was held in a freezer at 0° C., −10° C., −20° C., −30° C. and −40° C. for 10 days, and thereafter the liquid crystal phase was observed. For example, regarding the case where the nematic phase remained in the sample at −20° C. and it changed to crystal or smectic phase at −30° C., it was described as TC≦−20° C. The lower limit of temperature of the nematic phase is sometimes abbreviated as "lower limit of temperature".

Viscosity (η: measured at 20° C.; mPa·s)

An E-type viscometer was used to measure viscosity.

Refractive Index Anisotropy (Optical Anisotropy; Δn; Measured at 25° C.):

Measurement was conducted with an Abbe refractometer, in which a polarization plate is provided to an eyepiece, using light having a wavelength of 589 nm. After the surface of a main prism was rubbed in one direction, the sample was dropped on the main prism. The refractive index n ∥ was measured when the direction of polarized light was parallel to the direction of rubbing. The refractive index n ⊥ was measured when the direction of polarized light was perpendicular to the direction of rubbing. Calculation was made using the following equation: Δn=n∥−n⊥.

Dielectric Anisotropy (Δ∈; Measured at 25° C.)

1) Liquid Crystal Material whose Dielectric Anisotropy is Positive

The sample was put into a TN cell in which the gap between two glass substrates was about 9 μm and the twist angle was 80°. A sine wave (10V, 1 kHz) was applied on the cell, and 2 seconds later, the permittivity of liquid crystal molecules in the major axis direction (∈∥) was measured. A sine wave (0.5V, 1 kHz) was applied on the cell, and 2 seconds later, the permittivity of liquid crystal molecules in the minor axis direction (∈⊥) was measured. The value of dielectric anisotropy was calculated using the following equation: Δ∈=∈∥−∈⊥.

2) Liquid Crystal Material whose Dielectric Anisotropy is Negative

The sample was put into a liquid crystal cell treated to have a homeotropic alignment in which the gap between two glass substrates was about 9 μm. A sine wave (0.5V, 1 kHz) was applied on the cell, and 2 seconds later, the permittivity (∈∥) was measured. Further, the sample was put into a liquid crystal cell treated to have a homogeneous alignment in which the gap between two glass substrates was about 9 μm. A sine wave (0.5V, 1 kHz) was applied on the cell, and 2 seconds later, the permittivity (∈⊥) was measured. The value of dielectric anisotropy was calculated using the following equation: Δ∈=∈∥−∈⊥.

Voltage Holding Ratio (VHR: Measured at 25° C.; %)

The TN element used in the measurement had a polyimide-aligned film, and the cell gap was 6 μm. After putting the sample into the element, it was sealed with an adhesive which is polymerized by ultraviolet. A pulse voltage (5V for 60 μs) was applied on the TN element for charging. Attenuating voltage was measured for 16.7 msec using a high-speed voltmeter, and an area between the voltage curve and the horizontal axis in a cycle was calculated. Further, from the wave pattern of voltage measured after removing the TN element, an area was similarly calculated. Voltage holding ratio was calculated by comparison between the two areas.

Pitch (P; Measured at 25° C.; nm)

Pitch length was measured using selective reflection (Handbook of Liquid Crystal, page 196 (published in 2000, Maruzen)). The selective reflection wavelength λ satisfies the following relational expression: $<n>p/\lambda=1$. $<n>$ represents the average refractive index, which is calculated using the following formula: $<n>=\{(n\|^2+n\perp^2)/2\}^{1/2}$. The selective reflection wavelength was measured using a microspectrophotometer (JEOL Ltd., trade name: MSV-350). The pitch was calculated by dividing the obtained reflection wavelength by the average refractive index.

The pitch of cholesteric liquid crystal having a reflection wavelength in a longer-wavelength region compared to visible light is proportional to the inverse number of the concentration of optically active compounds in a region where the concentration of the optically active compounds is low. Therefore, the pitch was determined by measuring pitch length of liquid crystal having a selective reflection wavelength in the visible light region at several points and applying the linear extrapolation method thereto.

Example 1

A nematic liquid crystal composition A-1 was prepared by mixing compounds represented by the following formulae (a), (b-1) to (b-5), (c) and (d) (hereinafter referred to as "compound a", etc.) in the weight ratio shown below. Specifically, the composition was prepared by mixing: a compound a having the clearing point (N-I point) of 202° C., as the compound 1 represented by the above-described formula (1); a compound c having the clearing point (N-I point) of 35.5° C., as the compound 2 represented by the above-described formula (2); a compound d having the K-I point of 49.8° C., as the compound 2 represented by the above-described formula (3); and other compounds (compound b-1 to compound b-5). Values shown at the right side of values of the weight ratio are phase transition temperatures of respective compounds. The clearing point of the compound d was 7.7° C. The clearing point of the composition was given as an extrapolation value of N-I point, which was measured after mixing 15 wt % of compound d with the mother liquid crystal ZLI-1132 (manufactured by Merck).

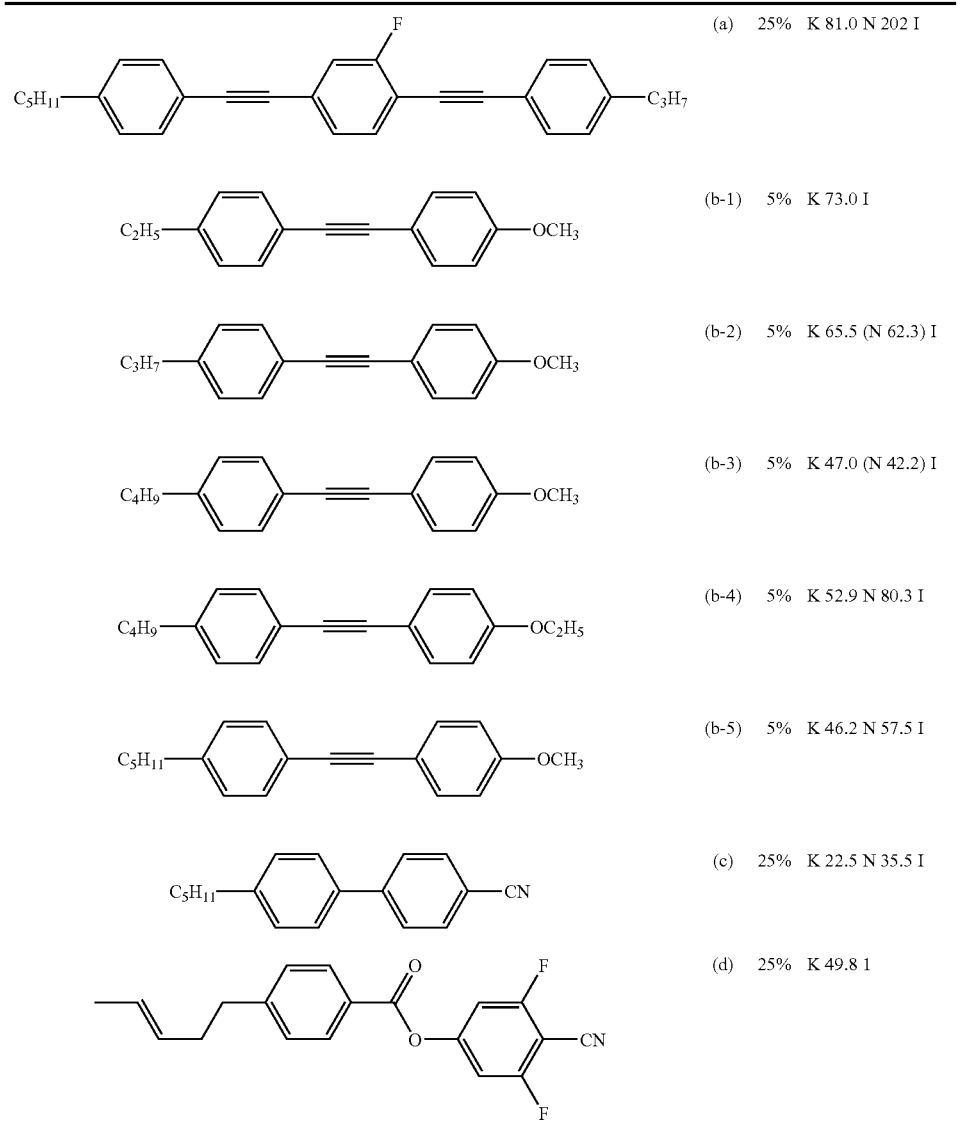

Next, a chiral dopant ISO-60BA2 represented by the following formula was added to the liquid crystal composition A-1 to obtain liquid crystal compositions A-2, A-3, A-4, A-5, A-6 and A-7.

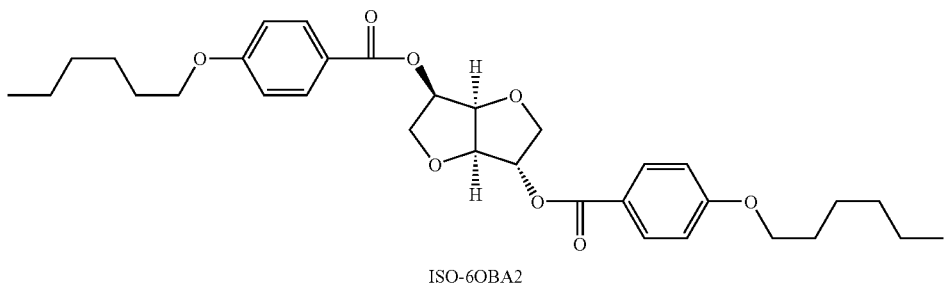 [SMILES: CCCCCCOc1ccc(C(=O)O[C@H]2CO[C@H]3[C@@H]2OC[C@H]3OC(=O)c2ccc(OCCCCCC)cc2)cc1]

ISO-6OBA2

Specifically, as shown in Table 1, liquid crystal compositions, in which the concentrations of chiral dopants are 7.5, 10.0, 11.0, 12.5, 16.6 and 20.0 wt % of the respective liquid crystal compositions obtained, were prepared and designated as liquid crystal compositions A-2, A-3, A-4, A-5, A-6 and A-7, respectively. Further, each of the liquid crystal compositions A-1 to A-7 was held in a cell consisting of two ITO-glasses which was not subjected to aligning treatment (cell thickness: 13 μm), and phase transition temperatures were measured using a polarization microscope.

BPX temperature ranges of the liquid crystal compositions A-6 and A-7 were 20° C. and 21° C., respectively. Thus, the liquid crystal compositions A-5 and A-7 exhibited the optically isotropic liquid crystal phase in wide temperature ranges in the elevated temperature process.

In optical textures of the optically isotropic liquid crystal phases of the liquid crystal compositions A-5 to A-7, platelet texture, which is found in the blue phases I and II, was not observed, and diffracted light with two or more colors was not observed. Further, in the case of the liquid crystal composi-

TABLE 1

| Liquid crystal composition | ISO-6OBA2 concentration (wt %) | Conditions | Phase transition temperature (° C.) | $N^* + I$ temperature range (° C.) | BPX temperature range (° C.) |
|---|---|---|---|---|---|
| A-1 | 0.0 | L.T. (1° C./min) | I-77.0-(N + I)-73-N | (4.0) | |
|  |  | E.T. (1° C./min) | N-75.5-(N + I)-78-I | | |
| A-2 | 7.5 | L.T. (1° C./min) | I-63.7-(N* + I)-56-N* | 7.7 | |
|  |  | E.T. (1° C./min) | N*-60.7-(N* + I)-66.5-I | | |
| A-3 | 10.0 | L.T. (1° C./min) | I-59.3-(N* + I)-48-N* | 11.3 | |
|  |  | E.T. (1° C./min) | N*-55.4-(N* + I)-63-I | | |
| A-4 | 11.0 | L.T. (1° C./min) | I-58.1-(N* + I)-45-N* | 13.1 | |
|  |  | E.T. (1° C./min) | N*-52.2-(N* + I)-60.5-I | | |
| A-5 | 12.5 | L.T. (1° C./min) | I-55.1-(N* + I)-39-N* | 16.1 | |
|  |  | E.T. (1° C./min) | N*-42.4-BPX-52.2-(N* + BPX)-57-I | | 9.8~14.6 |
| A-6 | 16.6 | L.T. (1° C./min) | I-47.6-(N* + I)-43.7-BPX-28-N* | | |
|  |  | E.T. (1° C./min) | N*-28-BPX-48-I | | 20 |
| A-7 | 20.0 | L.T. (1° C./min) | I-40.3-BPX-18-Un | | |
|  |  | E.T. (1° C./min) | Un-20-BPX-41-I | | 21 |

L.T.: Lowering temperature
E.T.: Elevating temperature

Phase transition temperatures of the liquid crystal compositions A-1 to A-7 were as shown in Table 1. Specifically, in the case of the liquid crystal composition A-1, the difference between the upper limit (77° C.) and the lower limit (73° C.) of a temperature allowing coexistence of the nematic phase (N) and the non-liquid crystalline isotropic phase (I) (hereinafter also referred to as "coexistence temperature range") in the lowered temperature process of −1° C./min was 4.0° C. In the case of the liquid crystal composition A-2, the difference between the upper limit (63.7° C.) and the lower limit (56° C.) of a temperature allowing coexistence of the chiral nematic phase (N*) and the non-liquid crystalline isotropic phase (I) (coexistence temperature range) in the lowered temperature process of −1° C./min was 7.7° C. Similarly, coexistence temperature ranges of the liquid crystal compositions A-3 and A-4 were 11.3° C. and 13.1 ° C., respectively.

In the case of the liquid crystal composition A-5, in the elevated temperature process of 1° C./min, the difference between the upper limit (57 to 52.2° C.) and the lower limit (42.4° C.) of a temperature at which the optically isotropic liquid crystal phase was exhibited (hereinafter also referred to as "BPX temperature range") was 9.8 to 14.6° C. Similarly, tion A-7, it had no color and was in dark field when observed under crossed nicols using a polarization microscope.

The N-I point ($T_1$), which is the clearing point of the compound a as the compound 1, was 202° C., the N-I point (Tx), which is the clearing point of the liquid crystal composition A-1, was 75.5° C., and therefore $T_1$-Tx=126.5° C.

Similarly, the N-I point ($T_1$), which is the clearing point of the compound a as the compound 1, was 202° C., the N*-I point (Tx), which is the clearing point of the liquid crystal composition A-2, was 60.7° C., and therefore $T_1$-Tx=141.3° C.

Similarly, $T_1$-Tx of each of the liquid crystal compositions A-3 to A-7 was as described below.

Liquid crystal composition A-3: $T_1$-Tx=202° C.−55.4° C.=146.6° C.

Liquid crystal composition A-4: $T_1$-Tx=202° C.−52.2° C.=149.8° C.

Liquid crystal composition A-5: $T_1$-Tx=202° C.−57° C.=145° C.

Liquid crystal composition A-6: $T_1$-Tx=202° C.−48° C.=154° C.

Liquid crystal composition A-7: $T_1-Tx=202°$ C.$-41°$ C.$=161°$ C.

Comparative Example 1

A liquid crystal composition E-I was prepared using only compounds b-1 to d (without using the compound a contained in the liquid crystal composition A-1 in Example 1). The specific composition thereof was as described below.

Specifically, as shown in Table 2, liquid crystal compositions, in which the concentrations of chiral dopants are 2.0, 3.5, 5.0 and 7.0 wt %, were prepared and designated as liquid crystal compositions E-2, E-3, E-4 and E-5, respectively. Further, each of the liquid crystal compositions E-1 to E-5 was held in a cell consisting of two ITO-glasses which was not subjected to aligning treatment (cell thickness: 13 μm), and phase transition temperatures were measured using a polarization microscope.

TABLE 2

| Liquid crystal composition | ISO-6OBA2 concentration (wt %) | Conditions | Phase transition temperature (° C.) | N* + I temperature range (° C.) | BPX temperature range (° C.) |
| --- | --- | --- | --- | --- | --- |
| E-1 | 0.0 | L.T. (1° C./min) | I-31.1-(N + I)-30.8-N | (0.3) | |
| | | E.T. (1° C./min) | N-31.4-(N + I)-31.5-I | | |
| E-2 | 2.0 | L.T. (1° C./min) | I-28.3-(N* + I)-27.5-N* | 0.8 | |
| | | E.T. (1° C./min) | N*-28.5-(N* + I)-28.85-I | | |
| E-3 | 3.5 | L.T. (1° C./min) | I-26.2-(N* + I)-25.0-N* | 1.2 | |
| | | E.T. (1° C./min) | N*-26.2-(N* + I)-26.9-I | | |
| E-4 | 5.0 | L.T. (1° C./min) | I-24.8-(N* + I)-23.5-N* | 1.3 | |
| | | E.T. (1° C./min) | N*-52.2-(N* + I)-60.5-I | | |
| E-5 | 7.0 | L.T. (1° C./min) | I-20.9-(BPI + I)-20.6-BPI-16.3-N* | | |
| | | E.T. (1° C./min) | N*-19.4-BPI-21.4-I | | 2.0 |

L.T.: Lowering temperature
E.T.: Elevating temperature

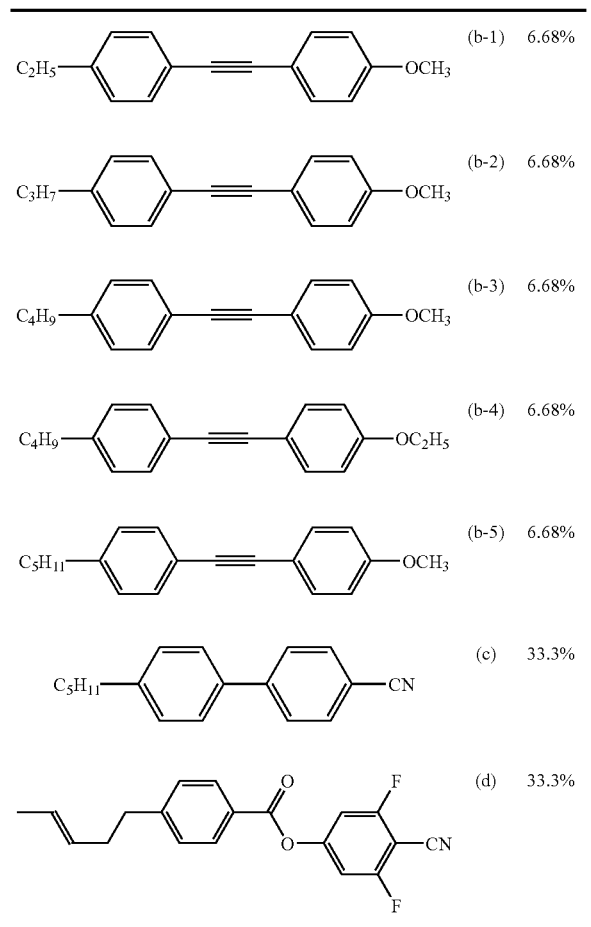

Next, the liquid crystal composition E-1 was mixed with a chiral dopant ISO-6OBA2 to obtain liquid crystal compositions E-2 to E-5.

Phase transition temperatures of the liquid crystal compositions E-1 to E-5 were as shown in Table 2. Specifically, in the case of the liquid crystal composition E-1, the difference between the upper limit (31.1° C.) and the lower limit (30.8° C.) of a temperature allowing coexistence of the nematic phase (N) and the non-liquid crystalline isotropic phase (I) (coexistence temperature range) in the lowered temperature process of −1° C./min was 0.3° C. In the case of the liquid crystal composition E-2, the difference between the upper limit (28.3° C.) and the lower limit (27.5° C.) of a temperature allowing coexistence of the chiral nematic phase (N*) and the non-liquid crystalline isotropic phase (I) (coexistence temperature range) in the lowered temperature process of −1° C./min was 0.8° C. Similarly, coexistence temperature ranges of the liquid crystal compositions E-3 and E-4 were 1.2° C. and 1.3° C., respectively.

Further, in the case of the liquid crystal composition E-5, the blue phase I was confirmed in the lowered temperature process and the elevated temperature process, and the difference between the upper limit and the lower limit of a temperature at which the blue phase I was exhibited in the elevated temperature process was 2.0° C.

Example 2

A nematic liquid crystal composition B-1 was prepared by mixing compounds represented by the following formulae (e-1), (e-2), (f) to (i) and (d) in the weight ratio described below. Specifically, the composition was prepared by mixing: compounds e-1 and e-2 having the N-I point (clearing point) of 250° C. or higher, as compounds represented by the above-described formula (1); a compound d having the K-I point of 49.8° C. and the clearing point (extrapolation value) of 7.7° C., as the compound 2 represented by the above-described formula (3); and compounds f to i. Values shown at the right side of values of the weight ratio are phase transition temperatures of respective compounds.

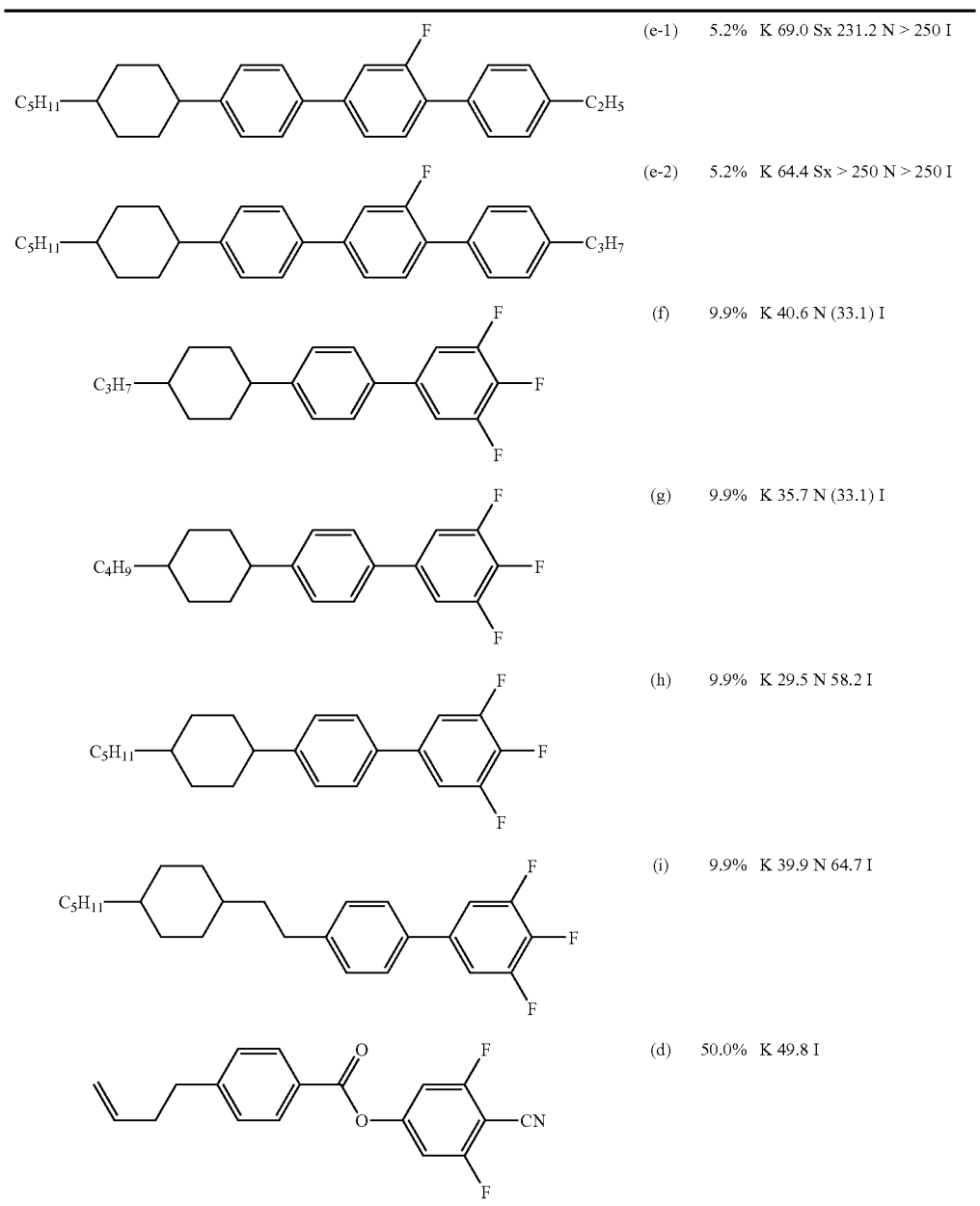

Next, a chiral dopant ISO-6OBA2 was added to the liquid crystal composition to obtain liquid crystal compositions B-2, B-3, B-4 and B-5. Specifically, as shown in Table 3, liquid crystal compositions, in which the concentrations of chiral dopants are 2.9, 5.0, 8.1 and 10.0 wt %, were prepared and designated as liquid crystal compositions B-2, B-3, B-4 and B-5, respectively. Further, each of the liquid crystal compositions B-1 to B-5 was held in a cell consisting of two ITO-glasses which was not subjected to aligning treatment (cell thickness: 13 μm), and phase transition temperatures were measured using a polarization microscope.

TABLE 3

| Liquid crystal composition | ISO-6OBA2 concentration (wt %) | Conditions | Phase transition temperature (° C.) | N* + I temperature range (° C.) | BP (X) temperature range (° C.) |
|---|---|---|---|---|---|
| B-1 | 0.0 | L.T. (1° C./min) | I-60.0-(N + I)-54.0-N | (6.0) | |
| | | E.T. (1° C./min) | N-56.5-(N + I)-62-I | | |
| B-2 | 2.9 | L.T. (1° C./min) | I-54.7-(N* + I)-48.6-N* | 6.1 | |
| | | E.T. (1° C./min) | N*-51.5-(N* + I)-57.3-I | | |

TABLE 3-continued

| Liquid crystal composition | ISO-6OBA2 concentration (wt %) | Conditions | Phase transition temperature (° C.) | N* + I temperature range (° C.) | BP (X) temperature range (° C.) |
|---|---|---|---|---|---|
| B-3 | 5.0 | L.T. (1° C./min) | I-50.9-(N* + I)-42.9-N* | 8 | |
|  |  | E.T. (1° C./min) | N*-45.3-(BP + N*)-46.1-BP-51.0-(N* + I)-52.9-I | | 4.9 |
| B-4 | 8.1 | L.T. (1° C./min) | I-42.9-(BP + I)-38.0-BP-32.5-N* | | |
|  |  | E.T. (1° C./min) | N*-34.7-BP-41.9-(BP + I)-44.9-I | | 7.2~10.2 |
| B-5 | 10.0 | L.T. (1° C./min) |  | | |
|  |  | E.T. (1° C./min) | N*-30.0-BP-40-I | | 10 |

L.T.: Lowering temperature
E.T.: Elevating temperature

Phase transition temperatures of the liquid crystal compositions B-1 to B-5 were as shown in Table 3. Specifically, in the case of the liquid crystal composition B-1, the difference between the upper limit (60° C.) and the lower limit (54° C.) of a temperature allowing coexistence of the nematic phase (N) and the non-liquid crystalline isotropic phase (I) (coexistence temperature range) in the lowered temperature process of −1° C./min was 6.0° C. In the case of the liquid crystal composition B-2, the difference between the upper limit (54.7° C.) and the lower limit (48.6° C.) of a temperature allowing coexistence of the chiral nematic phase (N*) and the non-liquid crystalline isotropic phase (I) (coexistence temperature range) in the lowered temperature process of −1° C./min was 6.1° C.

In the case of the liquid crystal composition B-4, in the elevated temperature process of 1° C./min, the difference between the upper limit (41.9° C. to 44.9° C.) and the lower limit (34.7° C.) of a temperature at which the optically isotropic liquid crystal phase was exhibited (BP temperature range) was 7.2° C. to 10.2° C. Similarly, the BP temperature range of the liquid crystal composition B-5 was 10° C. Thus, the liquid crystal compositions B-4 and B-5 exhibited the optically isotropic liquid crystal phase in the wide temperature range in the elevated temperature process.

Moreover, according to the polarization microscope images of the liquid crystal composition B-2 in the lowered temperature process at 54.5° C., 52° C. and 49° C. (FIG. 1), it was found that the non-liquid crystalline isotropic phase coexists with the chiral nematic phase in the liquid crystal composition.

The N-I point ($T_1$), which is the clearing point of the mixture of the same weight of the compounds e-1 and e-2 as the compound 1, was 270° C. or higher, the N-I point (Tx), which is the clearing point of the liquid crystal composition B-1, was 56.5° C., and therefore ($T_1$-Tx) was 213.5° C. or higher. Further, since the N*-I point (Tx), which is the clearing point of the liquid crystal composition B-2, was 51.5° C., ($T_1$-Tx) was 218.5° C. or higher.

Similarly, $T_1$-Tx of each of the liquid crystal compositions B-3 to B-5 was as described below.

Liquid crystal composition B-3: $T_1$-Tx=270° C. or higher −51.0° C.=219.0° C. or higher Liquid crystal composition B-4: $T_1$-Tx=270° C. or higher −41.9° C.=228.1° C. or higher Liquid crystal composition B-5: $T_1$-Tx=270° C. or higher −40° C.=230° C. or higher Comparative Example 2

A liquid crystal composition C-1 was prepared using compounds j to 1 and c. The specific composition thereof was as described below.

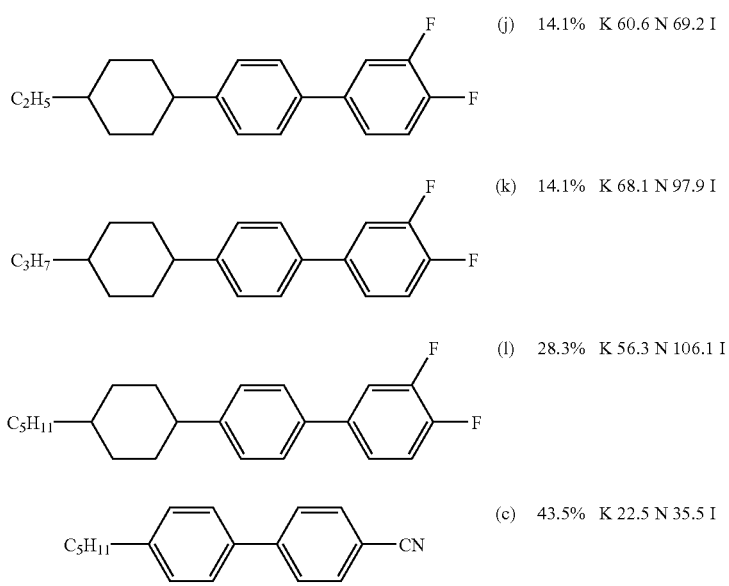

(j) 14.1% K 60.6 N 69.2 I (k) 14.1% K 68.1 N 97.9 I (l) 28.3% K 56.3 N 106.1 I (c) 43.5% K 22.5 N 35.5 I

Next, a chiral dopant ISO-60BA2 was added to the liquid crystal composition C-1 to obtain liquid crystal compositions C-2 to C-5. Specifically, as shown in Table 4, liquid crystal compositions, in which the concentrations of chiral dopants are 1.9, 4.0, 6.0 and 8.1 wt %, were prepared and designated as liquid crystal compositions C-2, C-3, C-4 and C-5, respectively. Further, each of the liquid crystal compositions C-1 to C-5 was held in a cell consisting of two ITO-glasses which was not subjected to aligning treatment (cell thickness: 13 μm), and phase transition temperatures were measured using a polarization microscope.

perature process of −1° C./min was 0.5° C. Similarly, the coexistence temperature range of the liquid crystal composition C-3 was 1.2° C.

In the case of the liquid crystal composition C-4, the difference between the upper limit (53.0° C.) and the lower limit (51.5° C.) of a temperature at which the optically isotropic liquid crystal phase was exhibited (BP temperature range) in the elevated temperature process was 1.5° C. Similarly, the BP temperature range of the liquid crystal composition C-5 was 1.8° C.

TABLE 4

| Liquid crystal composition | ISO-6OBA2 concentration (wt %) | Conditions | Phase transition temperature (° C.) | N* + I temperature range (° C.) | BP (X) temperature range (° C.) |
| --- | --- | --- | --- | --- | --- |
| C-1 | 0.0 | L.T. (1° C./min) | I-62.0-(N + I)-61.9-N | (0.1) | |
|  |  | E.T. (1° C./min) | N-62.3-(N + I)-62.5-I |  | |
| C-2 | 1.9 | L.T. (1° C./min) | I-59.2-(N* + I)-58.7-N* | 0.5 | |
|  |  | E.T. (1° C./min) | N*-59.6-(N* + I)-59.8-I |  | |
| C-3 | 4.0 | L.T. (1° C./min) | I-55.9-(N* + I)-54.7-N* | 1.2 | |
|  |  | E.T. (1° C./min) | N*-55.6-BP-56.4-I |  | 0.8 |
| C-4 | 6.0 | L.T. (1° C./min) | I-52.5-BP-48.2-N* | | |
|  |  | E.T. (1° C./min) | N*-51.5-BP-53.0-I |  | 1.5 |
| C-5 | 8.1 | L.T. (1° C./min) | I-48.8-(BP + I)-47.8BP-45.2-N* | | |
|  |  | E.T. (1° C./min) | N*-47.2-BP-49.0-I |  | 1.8 |

L.T.: Lowering temperature
E.T.: Elevating temperature

Phase transition temperatures of the liquid crystal compositions C-1 to C-5 were as shown in Table 4. Specifically, in the case of the liquid crystal composition C-1, the difference between the upper limit (62° C.) and the lower limit (61.9° C.) of a temperature allowing coexistence of the nematic phase (N) and the non-liquid crystalline isotropic phase (I) (coexistence temperature range) in the lowered temperature process of −1° C./min was 0.1° C.

In the case of the liquid crystal composition C-2, the difference between the upper limit (59.2° C.) and the lower limit (58.7° C.) of a temperature allowing coexistence of the chiral nematic phase (N*) and the non-liquid crystalline isotropic phase (I) (coexistence temperature range) in the lowered tem- Example 3

A nematic liquid crystal composition D-1 was prepared by mixing compounds represented by the following formulae (m), (n), (c) and (d) in the weight ratio described below. Specifically, the composition was prepared by mixing: compound (m) having the N-I point (clearing point) of 239° C. and compound n having the N-I point of 222° C., as compound 1 represented by the above-described formula (1); compound c having the clearing point (N-I point) of 36.5° C., as compound 2 represented by the above-described formula (2); and compound d having the K-I point of 49.8° C. and the clearing point (extrapolation value) of 7.7° C., as compound 2 represented by the above-described formula (3). Values shown at the right side of values of the weight ratio are phase transition temperatures of respective compounds.

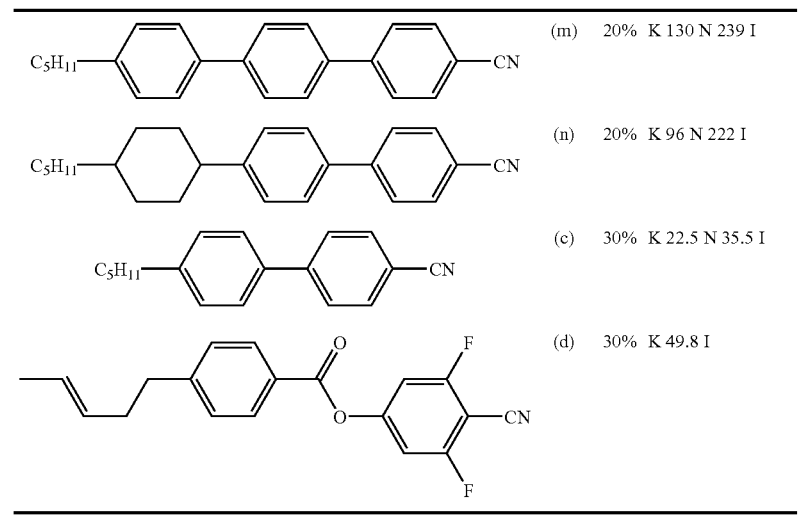

Next, a chiral dopant ISO-60BA2 was added to the liquid crystal composition D-1 to obtain liquid crystal compositions D-2, D-3 and D-4.

Specifically, as shown in Table 5, liquid crystal compositions, in which the concentrations of chiral dopants are 9.1, 14.3 and 20.4 wt % of the respective liquid crystal compositions obtained, were prepared and designated as liquid crystal compositions D-2, D-3 and D-4, respectively. Further, each of the liquid crystal compositions D-1 to D-4 was held in a cell consisting of two ITO-glasses which was not subjected to aligning treatment (cell thickness: 13 µm), and phase transition temperatures were measured using a polarization microscope.

In optical texture of the optically isotropic liquid crystal phases of the liquid crystal composition D-4, platelet texture, which is found in the blue phases I and II, was not observed, and diffracted light with two or more colors was not observed. Further, in the case of the liquid crystal composition D-4, it had no color and was in dark field when observed under crossed nicols using a polarization microscope.

The N-I point ($T_1$), which is the clearing point of the mixture of the same weight of the compounds m and n included in compound 1, was 230° C. The N-I point (Tx), which is the clearing point of the liquid crystal composition D-1, was 103.7° C. Therefore, ($T_1$-Tx) was 126.3° C.

TABLE 5

| Liquid crystal composition | ISO-6OBA2 concentration (wt %) | Conditions | Phase transition temperature (° C.) | N* + I temperature range (° C.) | BP (X) temperature range (° C.) |
|---|---|---|---|---|---|
| D-1 | 0.0 | L.T. (1° C./min) | I-107.6-(N + I)-95.0-N | (12.6) | |
|  |  | E.T. (1° C./min) | N-103.7-(N + I)-110-I |  |  |
| D-2 | 9.1 | L.T. (1° C./min) | I-91.5-(N* + I)-72.0-N* | 19.5 | |
|  |  | E.T. (1° C./min) | N*-84.0-(N* + I)-96-I |  |  |
| D-3 | 14.3 | L.T. (1° C./min) | I-81.8-(N* + I)-51.0-N* | 30.8 | |
|  |  | E.T. (1° C./min) | N*-65.3-(N* + I)-90-I |  |  |
| D-4 | 20.4 | L.T. (1° C./min) |  |  | 31~35 |
|  |  | E.T. (1° C./min) | N*-37-BPX-68-(BPX + I)-71-(BPX + N* + I)-72-I |  |  |

L.T.: Lowering temperature
E.T.: Elevating temperature

Phase transition temperatures of the liquid crystal compositions D-1 to D-4 were as shown in Table 5. Specifically, in the case of the liquid crystal composition D-1, the difference between the upper limit (107.6° C.) and the lower limit (95° C.) of a temperature allowing coexistence of the nematic phase (N) and the non-liquid crystalline isotropic phase (I) (coexistence temperature range) in the lowered temperature process of −1° C./min was 12.6° C.

In the case of the liquid crystal composition D-2, the difference between the upper limit (91.5° C.) and the lower limit (72.0° C.) of a temperature allowing coexistence of the chiral nematic phase (N*) and the non-liquid crystalline isotropic phase (I) (coexistence temperature range) in the lowered temperature process of −1° C./min was 19.5° C. Similarly, the coexistence temperature range of the liquid crystal composition D-3 was 30.8° C.

Further, in the case of the liquid crystal composition D-4, in the elevated temperature process of 1° C./min, the difference between the upper limit (68 to 72° C.) and the lower limit (37° C.) of a temperature at which the optically isotropic liquid crystal phase was exhibited (BPX temperature range) was 31 to 35° C. Thus, the liquid crystal composition D-4 exhibited the optically isotropic liquid crystal phase in the wide temperature range in the elevated temperature process.

Similarly, $T_1$-Tx of each of the liquid crystal compositions D-3 to D-4 was as follows.

Liquid crystal composition D-3: $T_1$-Tx=230° C.-65.3° C.=164.7° C.

Liquid crystal composition D-4: $T_1$-Tx=230° C.-68° C.=162° C.

Example 4

A nematic liquid crystal composition F-1 was prepared by mixing compounds represented by the following formulae (o-1), (o-2), (o-3) and (p) in the weight ratio described below. Specifically, the composition was prepared by mixing: compounds (o-1) to (o-3) having the N-I point (clearing point) of 250° C. or higher, as compounds represented by the above-described formula (1); and compound p having the K-I point of 21.4° C. and the clearing point (extrapolation value) of −41.6° C., as compound 2 represented by the above-described formula (3). Values shown at the right side of values of the weight ratio are phase transition temperatures of respective compounds.

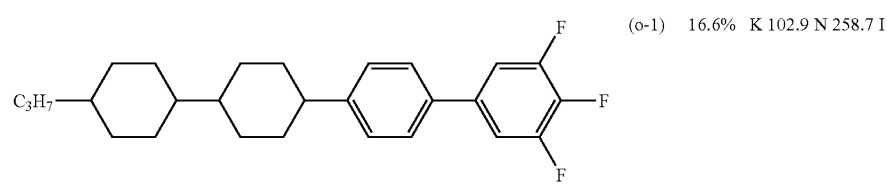

(o-1)  16.6%  K 102.9 N 258.7 I

-continued

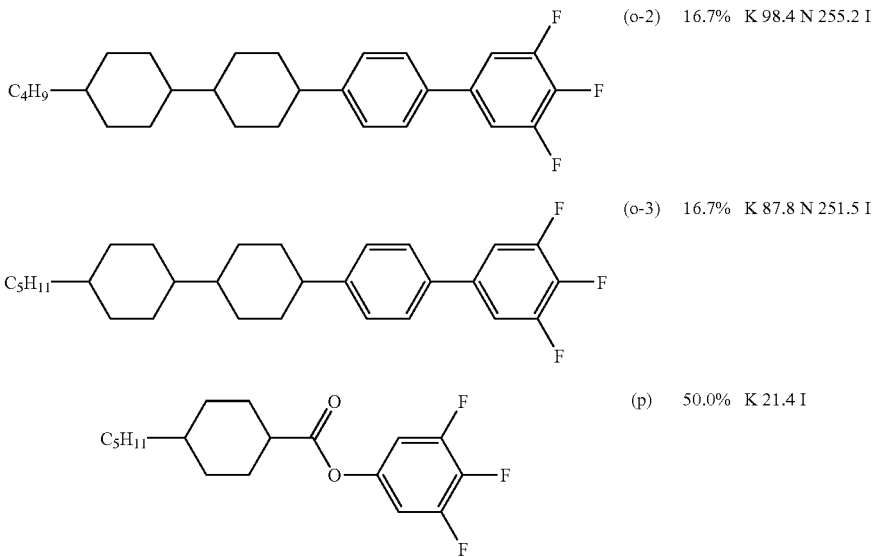

| | | |
|---|---|---|
| (o-2) | 16.7% | K 98.4 N 255.2 I |
| (o-3) | 16.7% | K 87.8 N 251.5 I |
| (p) | 50.0% | K 21.4 I |

Next, a chiral dopant ISO-60BA2 was added to the liquid crystal composition F-1 to obtain liquid crystal compositions F-2 and F-3. Specifically, as shown in Table 6, liquid crystal compositions, in which the concentrations of chiral dopants are 0.8 and 10.0 wt %, were prepared and designated as liquid crystal compositions F-2 and F-3, respectively. Further, each of the liquid crystal compositions F-2 and F-3 was held in a cell consisting of two ITO-glasses which was not subjected to aligning treatment (cell thickness: 13 μm), and phase transition temperatures were measured using a polarization microscope. In this regard, the clearing point of F-3 was determined as follows: the same cell as that used in Example 4 was used; an alternating sine wave (80 V) was applied on F-3 and observation was conducted using a polarization microscope; and a temperature at which the transmission rate was rapidly decreased under the elevated temperature condition was determined as the clearing point.

non-liquid crystalline isotropic phase (I) (coexistence temperature range) in the lowered temperature process of −1° C./min was 16.2° C.

Further, in the case of the liquid crystal composition F-3, in the elevated temperature process of 1° C./min, the difference between the upper limit (74° C.) and the lower limit (54° C.) of a temperature at which the optically isotropic liquid crystal phase was exhibited (BP(X) or BP temperature range) was 20° C. Thus, the liquid crystal composition F-3 exhibited the optically isotropic liquid crystal phase in the wide temperature range in the elevated temperature process.

The N-I point ($T_1$), which is the clearing point of the mixture of the same weight of compound o-1, compound o-2 and compound o-3 included in compound 1, was 254° C. The N-1 point (Tx), which is the clearing point of the liquid crystal composition F-1, was 89.2° C., and therefore ($T_1$-Tx) was

TABLE 6

| Liquid crystal composition | ISO-6OBA2 concentration (wt %) | Conditions | Phase transition temperature (° C.) | N* + I temperature range (° C.) | BP (X) temperature range (° C.) |
|---|---|---|---|---|---|
| F-1 | 0.0 | L.T. (1° C./min) | I-98.7-(N + I)-85-N | (13.7) | |
| | | E.T. (1° C./min) | N-89.2-(N + I)-101-I | | |
| F-2 | 0.8 | L.T. (1° C./min) | I-97.2-(N* + I)-81-N* | 16.2 | |
| | | E.T. (1° C./min) | N*-84-(N* + I)-101-I | | |
| F-3 | 10.0 | L.T. (1° C./min) | | | |
| | | E.T. (1° C./min) | N*-54-(BPX or BP)-74-I | | 20 |

L.T.: Lowering temperature
E.T.: Elevating temperature

Phase transition temperatures of the liquid crystal compositions F-1 to F-3 were as shown in Table 6. Specifically, in the case of the liquid crystal composition F-1, the difference between the upper limit (98.7° C.) and the lower limit (85° C.) of a temperature allowing coexistence of the nematic phase (N) and the non-liquid crystalline isotropic phase (I) (coexistence temperature range) in the lowered temperature process of −1° C./min was 13.7° C. In the case of the liquid crystal composition F-2, the difference between the upper limit (97.2° C.) and the lower limit (81° C.) of a temperature allowing coexistence of the chiral nematic phase (N*) and the 164.8° C. or higher. Further, since the N*-I point (Tx), which is the clearing point of the liquid crystal composition F-2, was 84° C., ($T_1$-Tx) was 170° C.

Example 5

Figure 2:
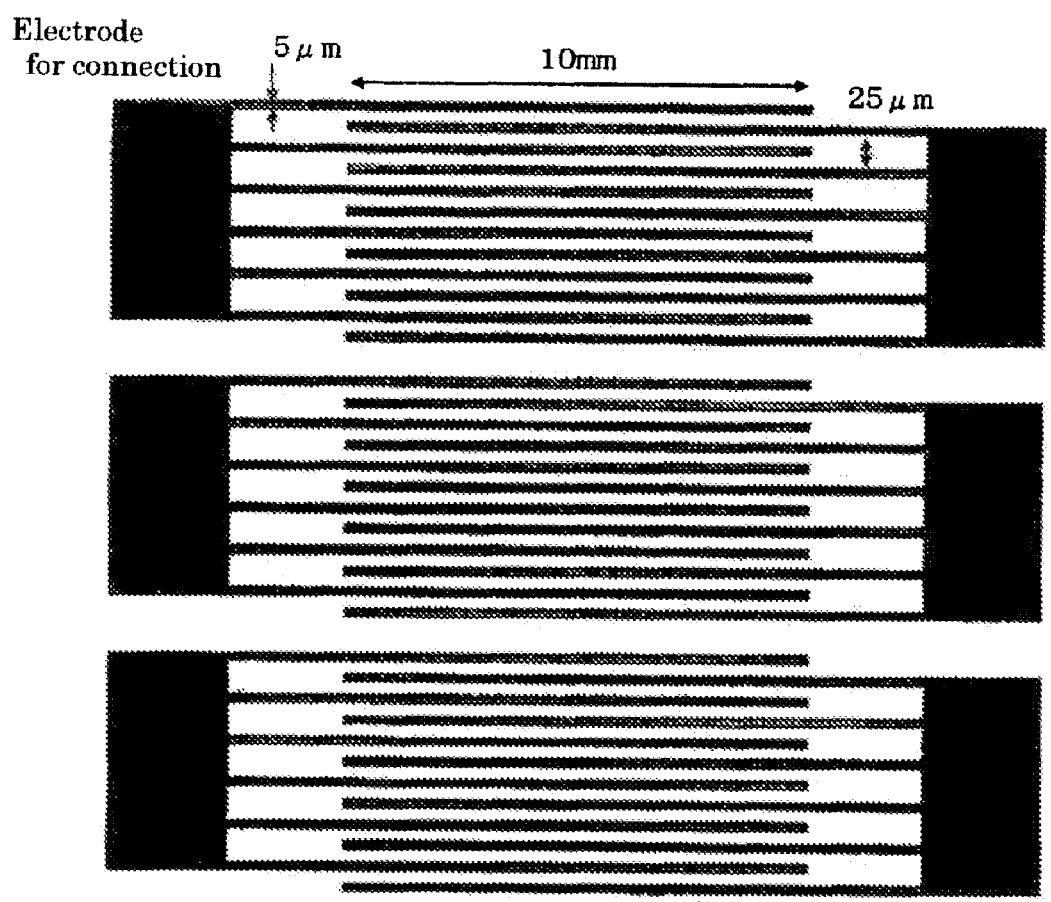
FIG. 2 shows a comb-like electrode substrate used in Example 5.
Figure 3:
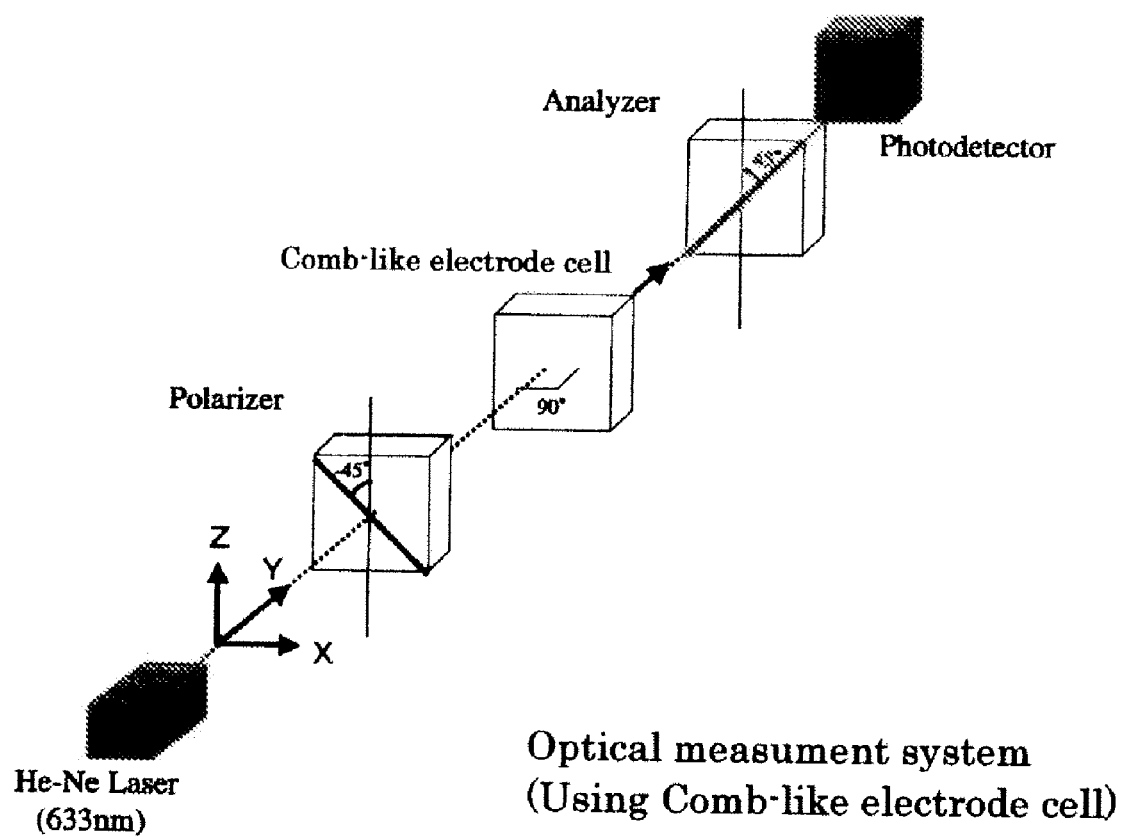
FIG. 3 shows an optical system used in Example 5.

The liquid crystal composition A-7 of Example 1 was held between a comb-like electrode substrate (FIG. 2) and an opposed glass substrate (no electrode is given) which were not subjected to aligning treatment (cell thickness: 12 μm), and these substrates including the composition (comb-like electrode cell) was set in the optical system shown in FIG. 3 to measure electrooptic characteristics.

The comb-like electrode cell was set in the optical system so that the incidence angle of laser light was perpendicular to the cell surface and the line direction of the comb-like electrode was 45° with respect to polarization plates of Polarizer and Analyzer, respectively. When a rectangular wave having the amplitude of 110 V was applied, the transmission rate was saturated. When detected using a photodetector, the transmitted light intensity at the time when no electric field was applied was 0.078, and the transmitted light intensity at the time when electric field was applied was 310. When the contrast was calculated, it was 3970. The response time during rise time (time required for change of transmitted light intensity from 10% to 90% of the intensity at the time of applying electric field) was 150 μs, and the response time during fall time (time required for change of the transmitted light intensity from 90% to 10% of the intensity at the time of applying electric field) was 110 μs. When electric field was applied in the same way under crossed nicols, no residual image was observed with a polarization microscope. The measurement was performed at room temperature (22° C.).

Thus, in the case of the liquid crystal composition A-7, two states (a bright state and a dark state) were successfully realized by turning on/off electric field, and short response time was successfully realized even when electric field was applied until the transmission rate was saturated.

INDUSTRIAL APPLICABILITY

Examples of applications of the invention include a liquid crystal material, a liquid crystal element comprising the liquid crystal material and the like.

What is claimed is:

1. An optically isotropic liquid crystal composition, which exhibits an optically isotropic liquid phase and does not exhibit nematic phase;
which is obtained by further adding chiral dopants to a composition in which the difference between the upper limit and the lower limit of a temperature allowing coexistence of a chiral nematic phase and a non-liquid crystalline isotropic phase is from approximately 3° C. to approximately 150° C.;
which comprises a compound 1 having the clearing point $T_1$ and a compound 2 having the clearing point $T_2$, and which has the clearing point $T_x$, wherein the liquid crystal composition comprises from approximately 10 wt % to approximately 80 wt % of compound 1 and from approximately 20 wt % to approximately 90 wt % of compound 2 and wherein the clearing point $T_1$, the clearing point $T_2$ and the clearing point Tx of the liquid crystal composition satisfy the following conditions:

$T_1 > T_2$ $T_1 - T_x \geq 100°$ C.;

wherein the compound 1 is represented by the following general formula (1):

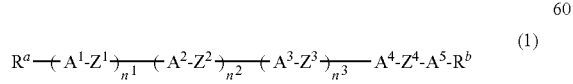

(1)

wherein:
$R^a$ is hydrogen or alkyl having 1 to 20 carbon atoms, wherein any —CH$_2$— in the alkyl can be replaced by —O—, —S—, —COO—, —OCO—, —CH=CH—, —CF=CF— or —C≡C—, and any hydrogen in the alkyl group can be replaced by halogen;
$R^b$ is hydrogen, halogen, —CN, —N=C=O, —N=C=S, —CF$_3$, —OCF$_3$ or alkyl having 1 to 20 carbon atoms, wherein any —CH$_2$— in the alkyl can be replaced by —O—, —S—, —COO—, —OCO—, —CH=CH—, —CF=CF— or —C≡C—, and any hydrogen in the alkyl can be replaced by halogen, and —CH$_3$ in the alkyl can be replaced by —CN;
$A^1$ to $A^5$ are each independently an aromatic or nonaromatic 3- to 8-membered ring or a condensed ring having 9 or more carbon atoms, wherein: any hydrogen in these rings can be replaced by halogen, alkyl having 1 to 3 carbon atoms or alkyl halide having 1 to 3 carbon atoms; any —CH$_2$— in the rings can be replaced by —O—, —S—, or —NH—; any —CH= in the rings can be replaced by —N=; and $A^1$ to $A^5$ are not tetrahydropyran rings;
$Z^1$ to $Z^4$ are each independently a single bond or alkylene having 1 to 8 carbon atoms, wherein any —CH$_2$— in the alkylene can be replaced by —O—, —S—, —COO—, —OCO—, —CSO—, —OCS—, —N=N—, —CH=N—, —N=CH—, —N(O)=N—, —N=N(O)—, —CH=CH—, —CF=CF— or —C≡C—, and any hydrogen can be replaced by halogen; and
$n^1$ to $n^3$ are each independently 0 or 1; when $R^b$ is hydrogen or fluorine, $n^2$ and $n^3$ are 1; when $Z^4$ is —COO—, $n^2$ and $n^3$ are 1; and only when at least one of $A^4$ and $A^5$ is a condensed ring having 9 or more carbon atoms, all of $n^1$ to $n^3$ can be 0,
and wherein the clearing point of the compound 1 is from approximately 150° C. to approximately 400° C.

2. The optically isotropic liquid crystal composition according to claim 1, which comprises a compound 1 having the clearing point $T_1$ and a compound 2 having the clearing point $T_2$, and which has the clearing point $T_x$, wherein the liquid crystal composition comprises from approximately 5 wt % to approximately 70 wt % of compound 1 and from approximately 30 to approximately 95 wt % of compound 2, and wherein the clearing point $T_1$, the clearing point $T_2$ and the clearing point Tx of the liquid crystal composition satisfy the following conditions:

$T_1 > T_2$ $T_1 - T_x \geq 150°$ C.

3. The optically isotropic liquid crystal composition according to claim 1, which comprises a compound 1 having the clearing point $T_1$ and a compound 2 having the clearing point $T_2$, and which has the clearing point $T_x$, wherein the liquid crystal composition comprises from approximately 5 wt % to approximately 70 wt % of compound 1 and from approximately 30 wt % to approximately 95 wt % of compound 2, and wherein the clearing point $T_1$, the clearing point $T_2$ and the clearing point Tx of the liquid crystal composition satisfy the following conditions:

$T_1 > T_2$ $T_1 - T_x \geq 200°$ C.

4. The optically isotropic liquid crystal composition according to claim 1, wherein the liquid crystal composition comprises from approximately 30 wt % to approximately 60 wt % of compound 1 and from approximately 30 wt % to approximately 70 wt % of compound 2.

5. The optically isotropic liquid crystal composition according to claim 1, wherein the compound 1 is represented by the following general formula (1):

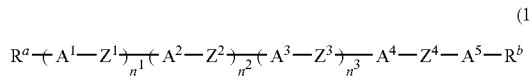

(1)

wherein: $R^a$ is alkyl having 1 to 10 carbon atoms, wherein any —$CH_2$— in the alkyl can be replaced by —O—, —S—, —COO—, —OCO—, —CH=CH— or —C≡C—;

$R^b$ is halogen, —CN, —N=C=O, —N=C=S, —$CF_3$, —$OCF_3$ or alkyl having 1 to 20 carbon atoms, wherein any —$CH_2$— in the alkyl can be replaced by —O—, —CH=CH— or —C≡C—, and any hydrogen in the alkyl can be replaced by halogen, and —$CH_3$ in the alkyl can be replaced by —CN;

$A^1$ to $A^5$ are each independently a benzene ring, a naphthalene ring or a cyclohexane ring, wherein any hydrogen in these rings can be replaced by halogen, alkyl having 1 to 3 carbon atoms or alkyl halide having 1 to 3 carbon atoms, and any —$CH_2$— in the rings can be replaced by —O— or —S—, and any —CH= in the rings can be replaced by —N=;

$Z^1$ to $Z^4$ are each independently a single bond or alkylene having 1 to 4 carbon atoms, wherein any —$CH_2$— in the alkylene can be replaced by —O—, —S—, —COO—, —OCO—, —CSO—, —OCS—, —CH=CH—, —CF=CF— or —C≡C—, and any hydrogen can be replaced by halogen; and $n^1$ to $n^3$ are each independently 0 or 1; when $R^b$ is hydrogen or fluorine, $n^2$ and $n^3$ are 1; and only when at least one of $A^4$ and $A^5$ is a condensed ring having 9 or more carbon atoms, all of $n^1$ to $n^3$ can be 0.

6. The optically isotropic liquid crystal composition according to claim 5, wherein:

$R^a$ is alkyl having 1 to 10 carbon atoms, wherein any —$CH_2$— in the alkyl can be replaced by —CH=CH— or —C≡C—;

$R^b$ is fluorine, chlorine, —CN, —N=C=S or alkyl having 1 to 20 carbon atoms, wherein any —$CH_2$— in the alkyl can be replaced by —O—, —CH=CH— or —C≡C—;

$A^1$ to $A^5$ are each independently a benzene ring, a naphthalene ring or a cyclohexane ring, wherein any hydrogen in the rings can be replaced by fluorine, chlorine, methyl, or methyl halide, and any —$CH_2$— in the rings can be replaced by —O— or —S—, and any —CH= in the rings can be replaced by —N=;

$Z^1$ to $Z^4$ are each independently a single bond or —C≡C—; and $n^1$ to $n^3$ are each independently 0 or 1; when $R^b$ is hydrogen or fluorine, $n^2$ and $n^3$ are 1; and only when at least one of $A^4$ and $A^5$ is a condensed ring having 9 or more carbon atoms, all of $n^1$ to $n^3$ can be 0.

7. The optically isotropic liquid crystal composition according to claim 5, wherein:

$R^a$ is alkyl having 1 to 10 carbon atoms, wherein any —$CH_2$— in the alkyl can be replaced by —O— or —CH=CH—;

$R^b$ is fluorine, chlorine, —CN or alkyl having 1 to 10 carbon atoms, wherein any —$CH_2$— in the alkyl can be replaced by —O—;

$A^1$ to $A^5$ are each independently a benzene ring, a dioxane ring or a cyclohexane ring, wherein any hydrogen in the benzene ring can be replaced by fluorine;

$Z^1$ to $Z^4$ are each independently a single bond or —C≡C—; and $n^1$ is 1, and $n^2$ and $n^3$ are 0.

8. The optically isotropic liquid crystal composition according to claim 1, wherein the compound 2 is represented by the following general formula (2):

(2)

wherein:

$R^c$ is hydrogen or alkyl having 1 to 20 carbon atoms, wherein any —$CH_2$— in the alkyl can be replaced by —O—, —S—, —COO—, —OCO—, —CH=CH—, —CF=CF— or —C≡C—, and any hydrogen in the alkyl can be replaced by halogen;

$R^d$ is halogen, —CN, —N=C=O, —N=C=S, —$CF_3$, —$OCF_3$, —C≡C—CN, or —C≡C—$CF_3$;

$A^6$ and $A^7$ are each independently an aromatic or nonaromatic 3- to 8- membered ring or a condensed ring having 9 or more carbon atoms, wherein any hydrogen in the rings can be replaced by halogen, alkyl having 1 to 3 carbon atoms or alkyl halide having 1 to 3 carbon atoms; any —$CH_2$— in the rings can be replaced by —O—, —S—, or —NH—; and any —CH= in the rings can be replaced by —N=;

$Z^6$ is a single bond or alkylene having 1 to 8 carbon atoms, wherein any —$CH_2$— in the alkylene can be replaced by —O—, —S—, —COO—, —OCO—, —CSO—, —OCS—, —N=N—, —CH=N—, —N=CH—, —N(O)=N—, —N=N(O)—, —CH=CH—, —CF=CF— or —C≡C—, and any hydrogen in the alkylene can be replaced by halogen; and $n^6$ is 0 or 1; and when $A^7$ is a condensed ring having 9 or more carbon atoms, $n^6$ is 0.

9. The optically isotropic liquid crystal composition according to claim 8, wherein:

$R^c$ is alkyl having 1 to 10 carbon atoms, wherein any —$CH_2$— in the alkyl can be replaced by —O—, —S—, —COO—, —OCO—, —CH=CH— or —C≡C—;

$R^d$ is halogen, —CN, —N=C=S, —$CF_3$, —C≡C—CN or —C≡C—$CF_3$;

$A^6$ and $A^7$ are each independently a benzene ring, a naphthalene ring or a cyclohexane ring, wherein any hydrogen in these rings can be replaced by halogen, alkyl having 1 to 3 carbon atoms, or alkyl halide having 1 to 3 carbon atoms; any —$CH_2$— in the rings can be replaced by —O— or —S—; and any —CH= in the rings can be replaced by —N=;

$Z^6$ is a single bond or alkylene having 1 to 4 carbon atoms, wherein any —$CH_2$— in the alkylene can be replaced by —O—, —S—, —COO—, —OCO—, —CSO—, —OCS—, —CH=CH—, —CF=CF— or —C≡C—; and any hydrogen in the alkylene can be replaced by halogen; and $n^6$ is 0 or 1; and when $A^7$ is a naphthalene ring, $n^6$ is 0.

10. The optically isotropic liquid crystal composition according to claim 8, wherein:

$R^c$ is alkyl having 1 to 10 carbon atoms, wherein any —$CH_2$— in the alkyl can be replaced by —CH=CH— or —C≡C—;

$R^d$ is halogen, —CN, —N=C=S, —$CF_3$, —C≡C—CN or —C≡C—$CF_3$;

$A^6$ and $A^7$ are each independently a benzene ring, a naphthalene ring or a cyclohexane ring, wherein any hydrogen in these rings can be replaced by fluorine, chlorine, methyl or methyl halide; any —$CH_2$— in these rings can be replaced by —O— or —S—; and any —CH= in the rings can be replaced by —N=;

$Z^6$ is a single bond, —COO—, —$CF_2$O— or —C≡C—; and $n^6$ is 0 or 1; and when $A^7$ is a naphthalene ring, $n^6$ is 0.

11. The optically isotropic liquid crystal composition according to claim 8, wherein:

$R^c$ is alkyl having 1 to 10 carbon atoms, wherein any —$CH_2$— in the alkyl can be replaced by —O—;

$R^d$ is halogen or —CN;

$A^6$ and $A^7$ are each independently a benzene ring, a dioxane ring or a cyclohexane ring, wherein any hydrogen in the benzene ring can be replaced by fluorine;

$Z^6$ is a single bond or —COO—; and $n^6$ is 0 or 1.

12. The optically isotropic liquid crystal composition according to claim 1, wherein the compound 2 is represented by the following general formula (3):

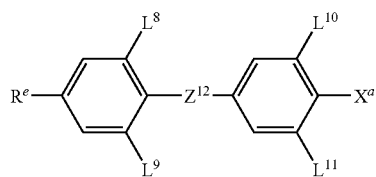
(3)

wherein:

$R^e$ is alkyl having 1 to 10 carbon atoms, wherein any —$CH_2$— in the alkyl can be replaced by —O—, —S—, —COO—, —OCO—, —CH=CH—, —CF=CF— or —C≡C—; and any hydrogen in the alkyl can be replaced by halogen;

$X^a$ is fluorine, chlorine, —CN, —N=C=S, —$CF_3$, —C≡C—CN or —C≡C—$CF_3$;

$Z^{12}$ is a single bond, —COO— or —C≡C—; and $L^8$ to $L^{11}$ are each independently hydrogen or fluorine.

13. The optically isotropic liquid crystal composition according to claim 12, wherein:

$R^e$ is alkyl having 1 to 10 carbon atoms, wherein any —$CH_2$— in the alkyl can be replaced by —O—, —CH=CH— or —C≡C—;

$X^a$ is fluorine or —CN;

$Z^{12}$ is —COO—; and $L^8$ to $L^{11}$ are each independently hydrogen or fluorine, wherein at least two of them are fluorine.

14. The optically isotropic liquid crystal composition according to claim 1, wherein the chiral dopants are included in an amount of from approximately 1 wt % to approximately 40 wt % per the total weight of the liquid crystal composition.

15. The optically isotropic liquid crystal composition according to claim 1, wherein the chiral dopants are included in an amount of from approximately 5 wt % to approximately 15 wt % per the total weight of the liquid crystal composition.

16. The optically isotropic liquid crystal composition according to claim 14, wherein further comprising a pitch, wherein the pitch is approximately 700 nm or lower.

17. The optically isotropic liquid crystal composition according to claim 14, wherein the chiral dopants comprise one or more compounds represented by any one of the following formulae (K1) to (K5):

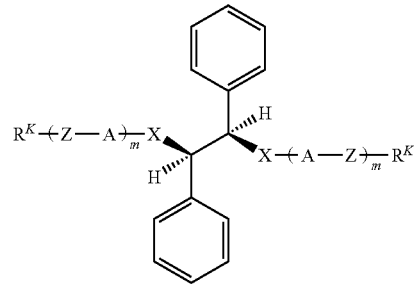
(K1)

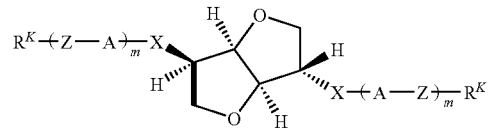
(K2)

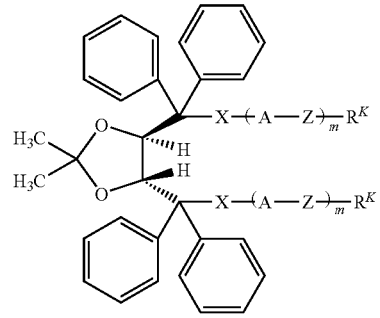
(K3)

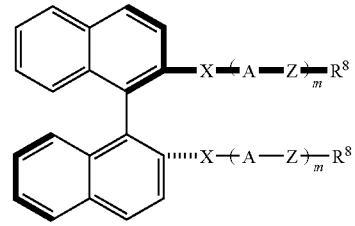
(K4)

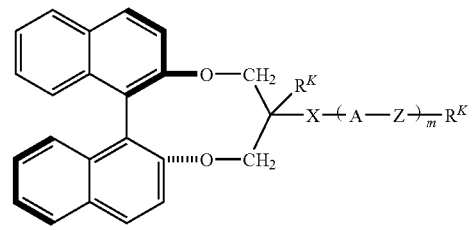
(K5)

wherein:

each $R^K$ is independently hydrogen, halogen, —CN, —N=C=O, —N=C=S or alkyl having 1 to 20 carbon atoms, wherein any —$CH_2$— in the alkyl can be replaced by —O—, —S—, —COO—, —OCO—, —CH=CH—, —CF=CF— or —C≡C—; and any hydrogen in the alkyl can be replaced by halogen;

each A is independently an aromatic or nonaromatic 3- to 8-membered ring or a condensed ring having 9 or more carbon atoms, wherein any hydrogen in these rings can be replaced by halogen, alkyl having 1 to 3 carbon atoms or haloalkyl having 1 to 3 carbon atoms; any —$CH_2$— in the rings can be replaced by —O—, —S— or —NH—; and any —CH═ in the rings can be replaced by —N═;

each Z is independently a single bond or alkylene having 1 to 8 carbon atoms, wherein any —CH$_2$— can be replaced by —O—, —S—, —COO—, —OCO—, —CSO—, —OCS—, —N═N—, —CH═N—, —N═CH—, —N(O)═N—, —N═N(O)—, —CH═CH—, —CF═CF— or —C≡C—; and any hydrogen can be replaced by halogen;

X is a single bond, —COO—, —CH$_2$O—, —CF$_2$O— or —CH$_2$CH$_2$—; and m is 1 to 4.

18. The optically isotropic liquid crystal composition according to claims 14, wherein the chiral dopants comprise one or more compounds represented by any one of the following formulae (K2-1) to (K2-8) and (K5-1) to (K5-3):

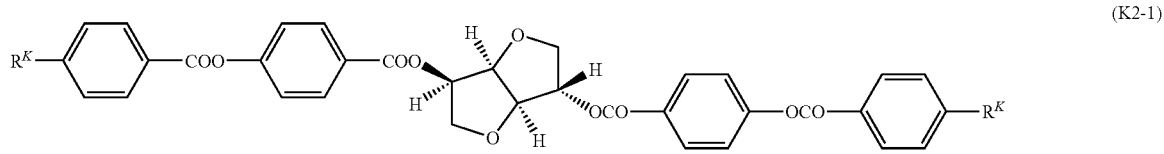
(K2-1)

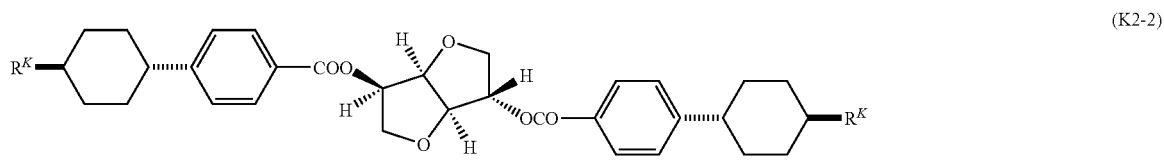
(K2-2)

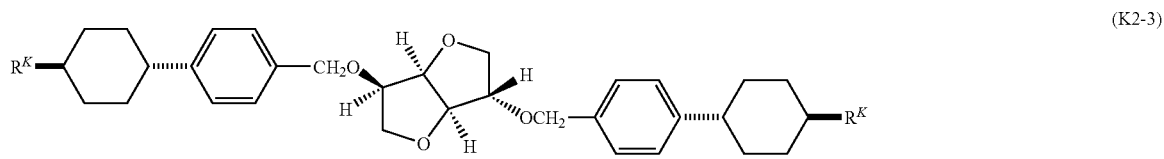
(K2-3)

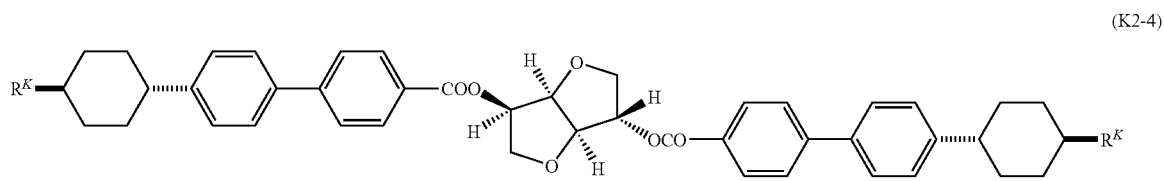
(K2-4)

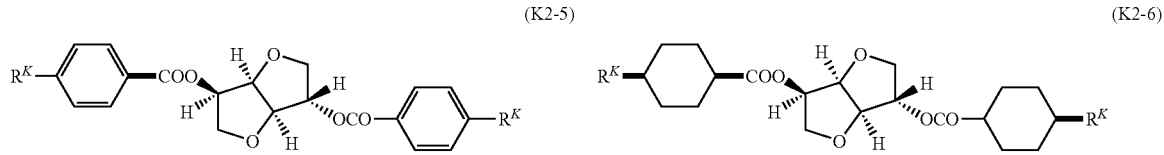
(K2-5)          (K2-6)

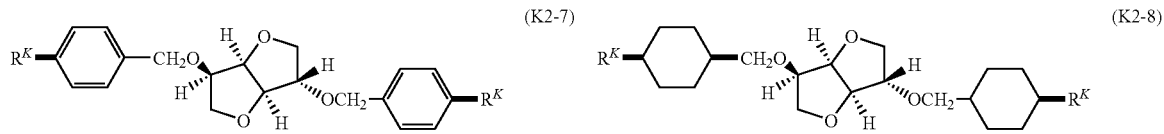
(K2-7)          (K2-8)

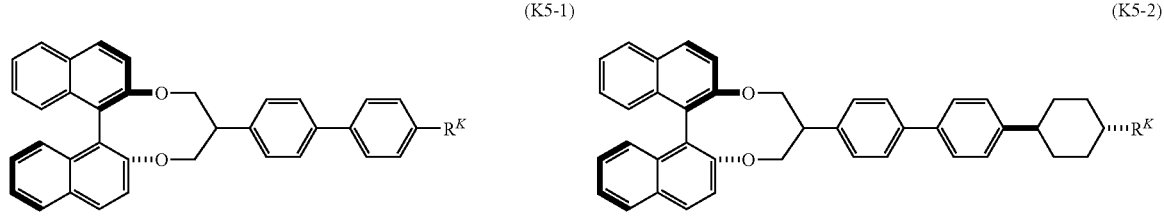
(K5-1)          (K5-2)

(K5-3)

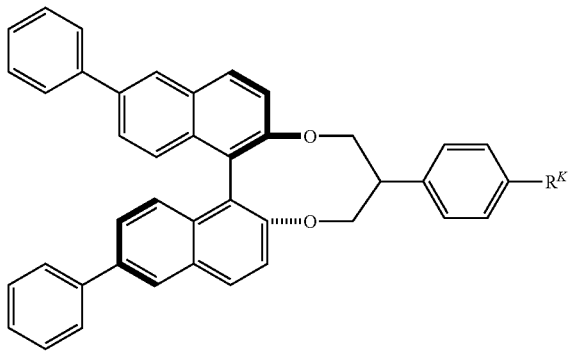

wherein:
each $R^K$ is independently alkyl having 3 to 10 carbon atoms, wherein —CH$_2$— adjacent to the ring in the alkyl can be replaced by —O—; and any —CH$_2$— in the alkyl can be replaced by —CH=CH—.

19. A liquid crystal composition, which comprises a compound 1 having the clearing point $T_1$, a compound 2 having the clearing point $T_2$ and chiral dopants, and whose clearing point is $T_x$,
wherein:
the liquid crystal composition comprises from approximately 20 wt % to approximately 40 wt % of compound 1, from approximately 20 wt % to approximately 60 wt % of compound 2, and from approximately 5 wt % to approximately 20 wt % of chiral dopants;
the compound 1 is represented by the following general formula (1):

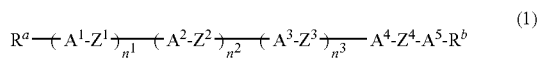

(1)

wherein:
$R^a$ and $R^b$ are each independently alkyl having 1 to 10 carbon atoms, wherein any —CH$_2$— in the alkyl can be replaced by —O—;
$A^1$ to $A^4$ are each independently a benzene ring, a dioxane ring or a cyclohexane ring, wherein any hydrogen in these rings can be replaced by fluorine, and $A^5$ is a benzene ring;
$Z^1$ to $Z^4$ are each independently a single bond or —C≡C—; and
$n^1$ is 1, and $n^2$ and $n^3$ are 0;
the compound 2 consists of a compound represented by the following general formula (2) and a compound represented by the following general formula (3),

(2)

wherein in the formula (2):
$R^c$ is alkyl having 1 to 10 carbon atoms, wherein any —CH$_2$— in the alkyl can be replaced by —O—;
$R^d$ is halogen or —CN;
$A^6$ is a benzene ring or a cyclohexane ring, wherein any hydrogen in these rings can be replaced by fluorine, and $A^7$ is a benzene ring;

$Z^6$ is a single bond or —COO—; and
$n^6$ is 1,

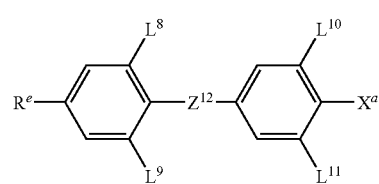

(3)

and wherein in the formula (3):
$R^e$ is alkyl having 1 to 10 carbon atoms, wherein any —CH$_2$— in the alkyl can be replaced by —O—, —CH=CH— or —C≡C—;
$X^a$ is fluorine or —CN;
$Z^{12}$ is —COO—; and
$L^8$ to $L^{11}$ are each independently hydrogen or fluorine, wherein at least two of them are fluorine, and at least one of $L^{10}$ and $L^{11}$ is fluorine, and wherein the chiral dopants comprise one or more compounds represented by the following formulae (K2-5) to (K2-8):

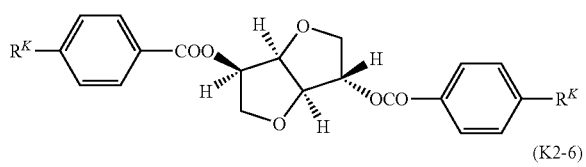

(K2-5)

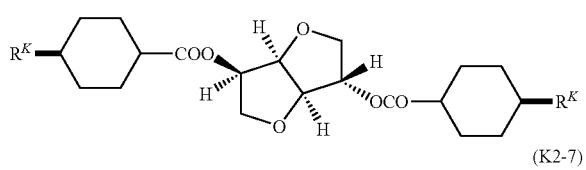

(K2-6)

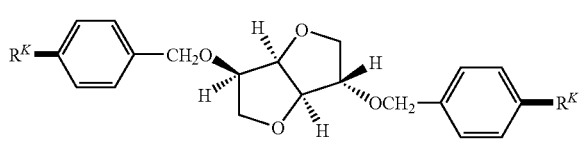

(K2-7)

(K2-8)

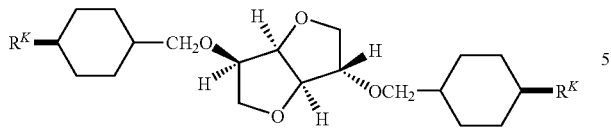

wherein each $R^K$ is independently alkyl having 3 to 10 carbon atoms, wherein —$CH_2$— adjacent to the ring in the alkyl can be replaced by —O—, and any —$CH_2$— in the alkyl can be replaced by —CH=CH—;

the clearing point $T_1$, the clearing point $T_2$ and the clearing point $T_x$ of the liquid crystal composition satisfy the following conditions:

$T_1 > T_2$ $T_1 - T_x \geqq 100°$ C.; and an optically isotropic liquid crystal phase has an optically isotropic phase which does not show diffracted light with two or more colors.

20. A liquid crystal composition, which comprises a compound 1 having the clearing point $T_1$, a compound 2 having the clearing point $T_2$ and chiral dopants, and whose clearing point is $T_x$,
wherein:
the liquid crystal composition comprises from approximately 8 wt % to approximately 30 wt % of compound 1, from approximately 40 wt % to approximately 60 wt % of compound 2, and from approximately 5 wt % to approximately 20 wt % of chiral dopants;
the compound 1 is represented by the following general formula (1):

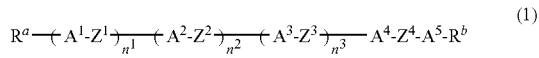

wherein:
$R^a$ is alkyl having 1 to 10 carbon atoms, wherein any —$CH_2$— in the alkyl can be replaced by —O—;
$A^1$ to $A^4$ are each independently a benzene ring, a dioxane ring or a cyclohexane ring, wherein any hydrogen in the benzene ring can be replaced by fluorine, and $A^5$ is a benzene ring;
$Z^1$ to $Z^4$ are each independently a single bond or —C≡C—; and
$n^1$ and $n^2$ are 1 and $n^3$ is 0;
the compound 2 is represented by the following general formula (3):

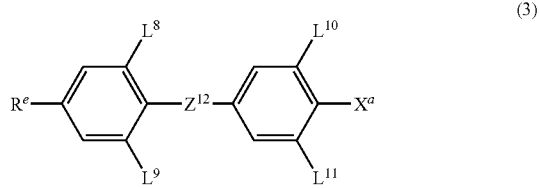

wherein:
$R^e$ is alkyl having 1 to 10 carbon atoms, wherein any —$CH_2$— in the alkyl can be replaced by —O—, —CH=CH— or —C≡C—;

$X^a$ is fluorine or —CN;
$Z^{12}$ is —COO—; and
$L^8$ to $L^{11}$ are each independently hydrogen or fluorine, wherein at least two of them are fluorine, and at least one of $L^{10}$ and $L^{11}$ is fluorine;
the chiral dopants comprise one or more compounds represented by the following formulae (K2- 5) to (K2- 8):

(K2-5)
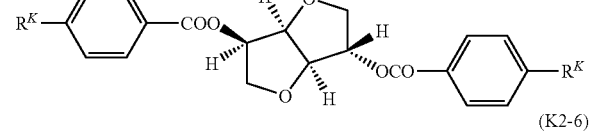

(K2-6)
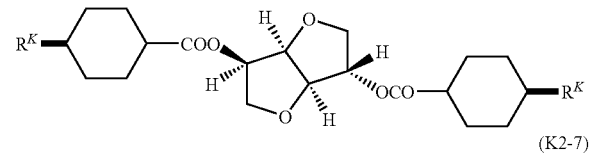

(K2-7)
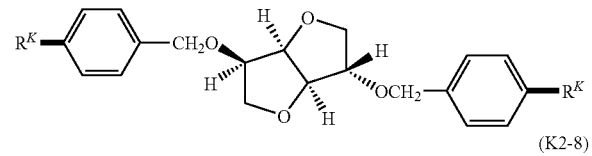

(K2-8)
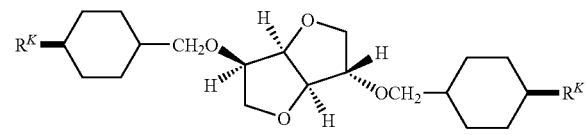

wherein each $R^K$ is independently alkyl having 3 to 10 carbon atoms, wherein —$CH_2$— adjacent to the ring in the alkyl can be replaced by —O—, and any —$CH_2$— in the alkyl can be replaced by —CH=CH—;

the clearing point $T_1$, the clearing point $T_2$ and the clearing point $T_x$ of the liquid crystal composition satisfy the following conditions:

$T_1 > T_2$ $T_1 - T_x \geqq 150°$ C.; and an optically isotropic liquid crystal phase has an optically isotropic phase which shows diffracted light with two or more colors.

21. A liquid crystal composition, which comprises a compound 1 having the clearing point $T_1$, a compound 2 having the clearing point $T_2$ and chiral dopants, and whose clearing point is $T_x$,
wherein:
the liquid crystal composition comprises from approximately 20 wt % to approximately 40 wt % of compound 1, from approximately 20 wt % to approximately 60 wt % of compound 2, and from approximately 5 wt % to approximately 25 wt % of chiral dopants;
the compound 1 is represented by the following general formula (1):

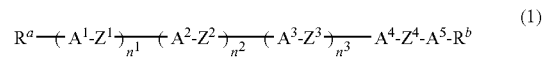

wherein:
- $R^a$ is alkyl having 1 to 10 carbon atoms, wherein any —CH$_2$— in the alkyl can be replaced by —O—;
- $R^b$ is halogen, —CN, —N=C=O, —N=C=S, —CF$_3$, or —OCF$_3$;
- $A^1$ to $A^4$ are each independently a benzene ring, a dioxane ring or a cyclohexane ring, wherein any hydrogen in the benzene ring can be replaced by fluorine, and $A^5$ is a benzene ring;
- $Z^1$ to $Z^4$ are each independently a single bond or —C≡C—; and
- $n^1$ is 1, and $n^2$ and $n^3$ are 0;

the compound 2 consists of a compound represented by the following general formula (2) and a compound represented by the following general formula (3),

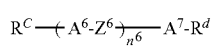
(2)

wherein in the formula (2):
- $R^c$ is alkyl having 1 to 10 carbon atoms, wherein any —CH$_2$— in the alkyl can be replaced by —O—;
- $R^d$ is halogen or —CN;
- $A^6$ is a benzene ring or a cyclohexane ring, wherein any hydrogen in these rings can be replaced by fluorine, and $A^7$ is a benzene ring;
- $Z^6$ is a single bond or —COO—; and
- $n^6$ is 1,

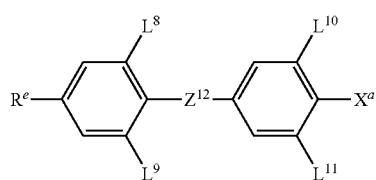
(3)

and wherein in the formula (3):
- $R^e$ is alkyl having 1 to 10 carbon atoms, wherein any —CH$_2$— in the alkyl can be replaced by —O—, —CH=CH— or —C≡C—;
- $X^a$ is fluorine or —CN;
- $Z^{12}$ is —COO—; and
- $L^8$ to $L^{11}$ are each independently hydrogen or fluorine, wherein at least two of them are fluorine, and at least one of $L^{10}$ and $L^{11}$ is fluorine, and wherein the chiral dopants comprise one or more compounds represented by the following formulae (K2-5) to (K2-8):

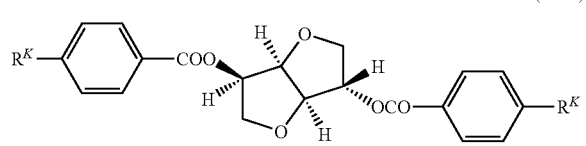
(K2-5)

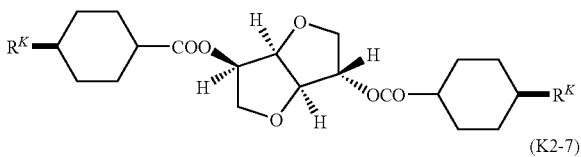
(K2-6)

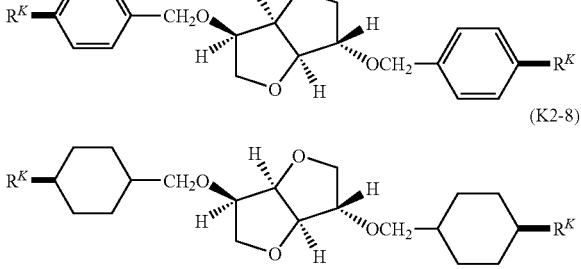
(K2-7)

(K2-8)

wherein each $R^K$ is independently alkyl having 3 to 10 carbon atoms, wherein —CH$_2$— adjacent to the ring in the alkyl can be replaced by —O—, and any —CH$_2$— in the alkyl can be replaced by —CH=CH—;

the clearing point $T_1$, the clearing point $T_2$ and the clearing point $T^x$ of the liquid crystal composition satisfy the following conditions:

$$T_1 > T_2$$

$$T_1 - T_x \geq 100° C.; \text{ and}$$

an optically isotropic liquid crystal phase has an optically isotropic phase which does not show diffracted light with two or more colors.

22. A liquid crystal element, in which an electrode is placed on one or both surfaces thereof, and which has a liquid crystal composition placed between substrates and an electric field applying means for applying electric field on the liquid crystal composition via the electrode, wherein the liquid crystal composition is that according to claim 1.

23. A liquid crystal element, in which an electrode is placed on one or both surfaces thereof, and which has: a pair of substrates, at least one of which is transparent; a liquid crystal composition placed between the substrates; and polarization plates placed on the external sides of the substrates, and which has an electric field applying means for applying electric field on the liquid crystal composition via the electrode, wherein the liquid crystal composition is that according to claim 1.

24. The liquid crystal element according to claim 23, wherein the electrode is constituted on at least one of the pair of substrates so that electric field can be applied in at least two directions.

25. The liquid crystal element according to claim 23, wherein the electrode is constituted on one or both of the pair of substrates placed in parallel with each other so that electric field can be applied in at least two directions.

26. The liquid crystal element according to claim 22, wherein: the electrode is placed in a matrix state to constitute a pixel electrode; each pixel has an active element; and the active element is a thin film transistor (TFT).

27. The optically isotropic liquid crystal composition according to claim 1, which is obtained by further adding chiral dopants to a composition in which a difference between an upper limit and a lower limit of a temperature allowing coexistence of a chiral nematic phase and a non-liquid crystalline isotropic phase is from approximately 5° C. to approximately 150° C.

28. The optically isotropic liquid crystal composition according to claim 1, which is obtained by further adding chiral dopants to a composition in which a difference between an upper limit and a lower limit of a temperature allowing coexistence of a nematic phase and a non-liquid crystalline isotropic phase is from approximately 320 C. to approximately 150° C.

* * * * *